(12) United States Patent
Kollmann et al.

(10) Patent No.: US 12,066,348 B2
(45) Date of Patent: Aug. 20, 2024

(54) SENSOR MAT FOR AN AREA SENSOR SYSTEM, AREA SENSOR SYSTEM, AND METHOD FOR PRODUCING A SENSOR MAT

(71) Applicant: ARDEX GmbH, Witten (DE)

(72) Inventors: Philipp Karl Kollmann, Edelschrott (AT); Emanuel Schreiber, Herdecke (DE); Jörg Sieksmeier, Essen (DE); Marco Schröder, Lippstadt (DE)

(73) Assignee: ARDEX GmbH, Witten (DE)

( * ) Notice: Subject to any disclaimer, the term of this patent is extended or adjusted under 35 U.S.C. 154(b) by 502 days.

(21) Appl. No.: 16/971,394

(22) PCT Filed: Feb. 20, 2019

(86) PCT No.: PCT/EP2019/054235
§ 371 (c)(1),
(2) Date: Aug. 20, 2020

(87) PCT Pub. No.: WO2019/162336
PCT Pub. Date: Aug. 29, 2019

(65) Prior Publication Data
US 2021/0088397 A1    Mar. 25, 2021

(30) Foreign Application Priority Data
Feb. 20, 2018 (DE) ............ 10 2018 103 790.2

(51) Int. Cl.
*G01L 9/00* (2006.01)
*B32B 37/02* (2006.01)
*B32B 37/18* (2006.01)

(52) U.S. Cl.
CPC ............ *G01L 9/0005* (2013.01); *B32B 37/02* (2013.01); *B32B 37/18* (2013.01)

(58) Field of Classification Search
None
See application file for complete search history.

(56) References Cited

U.S. PATENT DOCUMENTS

| 6,515,586 B1 | 2/2003 | Wymore |
| 2007/0171058 A1 | 7/2007 | Knowles et al. |

(Continued)

FOREIGN PATENT DOCUMENTS

| CN | 1745402 | 3/2006 |
| DE | 10337940 | 7/2004 |

(Continued)

OTHER PUBLICATIONS

Internationaler Recherchenbericht und Schriftlicher Bescheid [International Search Report and the Written Opinion] Dated Jun. 7, 2019 From the International Searching Authority Re. Application No. PCT/EP2019/054235 and Its Translation of Search Report Into English. (10 Pages).

(Continued)

*Primary Examiner* — Michael N Orlando
*Assistant Examiner* — Abhishek A Patwardhan

(57) ABSTRACT

The invention relates to a sensor mat (4) for an area sensor system (1.2), particularly for monitoring a room (101) of a building (100), comprising a flexible base unit (10) that has a first carrier element (11) with a planar extension and a first main side (11.1) and a second main side (11.2), and at least one detection means (30) for detecting an event (3). In addition, the invention relates to an area sensor system (1.2) for detecting an event (3), and to a method (200) for producing a sensor mat (4).

26 Claims, 12 Drawing Sheets

(56) References Cited

U.S. PATENT DOCUMENTS

| | | | | |
|---|---|---|---|---|
| 2011/0272392 A1* | 11/2011 | Dohring | .................... | H05B 3/20 |
| | | | | 29/592.1 |
| 2015/0054649 A1* | 2/2015 | Desgorces | ........... | A61B 5/6889 |
| | | | | 340/573.1 |
| 2015/0077142 A1* | 3/2015 | Pitkanen | .............. | G01N 27/041 |
| | | | | 156/244.11 |
| 2015/0276963 A1* | 10/2015 | Casimiro | ............... | G08B 13/26 |
| | | | | 324/658 |
| 2016/0014847 A1* | 1/2016 | Jeong | ..................... | H05B 3/286 |
| | | | | 219/541 |
| 2018/0163410 A1* | 6/2018 | Peace | .................... | E04F 13/072 |

FOREIGN PATENT DOCUMENTS

| | | |
|---|---|---|
| DE | 102009051409 | 5/2011 |
| EP | 3333340 | 6/2018 |
| JP | 11-328544 | 11/1999 |
| WO | WO 2016/083294 | 6/2016 |

OTHER PUBLICATIONS

Pruefungsantrag [Request for Examination] Dated Oct. 2, 2018 From the Deutsches Patent—und Markenamt [German Patent and Trademark Office] Re. Application No. 102018103790.2 and Its Summary in English. (10 Pages).

Notification of Office Action and Search Report Dated Sep. 22, 2021From the State Intellectual Property Office of the People's Republic of China Re. Application No. 201980014576.4 and Its Translation of Office Action Into English. (30 Pages).

Notification of Office Action Dated Jun. 27, 2022 From the State Intellectual Property Office of the People's Republic of China Re. Application No. 201980014576.4 and Its Summary in English. (12 Pages).

Mitteilung Gemäß Artikel 94(3) EPÜ [Communication Pursuant to Article 94(3) EPC] Dated Jan. 31, 2023 From the European Patent Office Re. Application No. 19706963.6 and Its Translation Into English. (19 Pages).

* cited by examiner

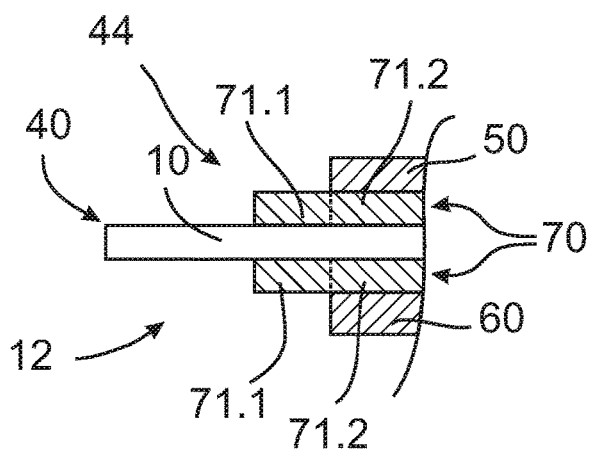
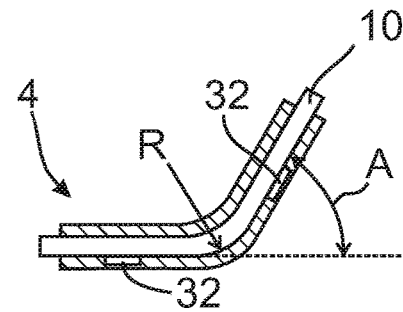
Fig. 6   Fig. 7
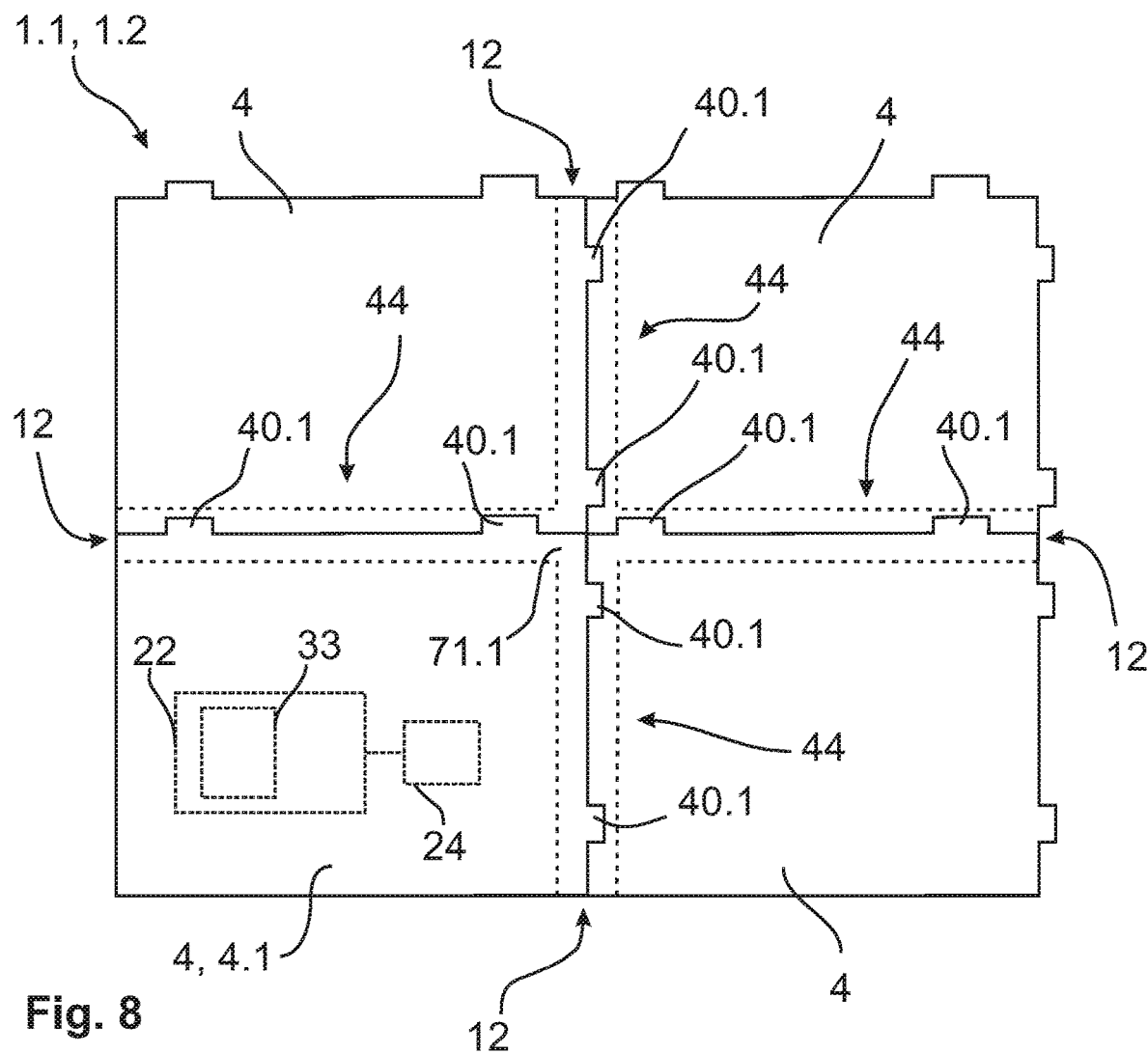
Fig. 8

SENSOR MAT FOR AN AREA SENSOR SYSTEM, AREA SENSOR SYSTEM, AND METHOD FOR PRODUCING A SENSOR MAT

RELATED APPLICATIONS

This application is a National Phase of PCT Patent Application No. PCT/EP2019/054235 having International filing date of Feb. 20, 2019, which claims the benefit of priority of German Patent Application No. 10 2018 103 790.2 filed on Feb. 20, 2018. The contents of the above applications are all incorporated by reference as if fully set forth herein in their entirety.

FIELD AND BACKGROUND OF THE INVENTION

The invention relates to a sensor mat for a surface sensor system, in particular for monitoring a room of a building, a surface sensor system for detecting an event in a room of a building and a method for producing a sensor mat for a surface sensor system.

From the prior art, for example, it is known to monitor a part of a room by a motion detector so that a movement of a person can be detected. However, it is a disadvantage that normally it can only be detected whether a movement has taken place in the room, but this movement cannot be localized. Furthermore, such motion detectors usually require a line of sight to the event, so that in a room of a building, for example, by placing furniture dead spaces can be created in which a detection of the event is not possible. In addition, such motion detectors are often installed as an additional structural element in a region of the room so that they are clearly visible and can therefore have a negative effect on the visual impression in the room. It is also often not possible to distinguish the presence of a plurality of persons from the presence of one person or even to assign changes in the position of individual persons to the respective persons. However, this can be of interest, for example, if streams of visitors in a department store are to be analyzed or the activity of individual persons in a room is to be monitored, for example, in order to detect an emergency of a person in a retirement home at an early stage.

It is an object of the present invention to at least partially remedy any prior disadvantages known from the prior art. In particular, it is an object of the present invention to provide a sensor system by means of which the detection of an event is improved and which can preferably be installed in a simple manner with an increased range of functions.

The above-mentioned object is solved by a sensor mat with the features of claim 1, a surface sensor system with the features of claim 41, and a method for producing a sensor mat with the features of claim 42.

Further features and details of the invention result from the dependent claims, the description and the figures. Features and details which have been described in reference to the sensor mat according to the invention are of course also valid in reference to the surface sensor system and/or the method according to the invention and vice versa, so that with regard to the disclosure of the individual aspects of the invention reference is or can always be made to each other.

SUMMARY OF THE INVENTION

According to the invention, the sensor mat for a surface sensor system, in particular for monitoring a room in a building, comprises a flexible base unit. The flexible base unit comprises a first carrier element which comprises a flat extension with a first base side and a second base side. Furthermore, the flexible base unit comprises at least one sensing means for detecting an event. The sensing means is arranged on the second base side of the first carrier element in such a way that the base unit can be laid flat for the design of the surface sensor system.

Preferably, the base unit and/or the sensor mat can be designed as a plate. In particular, the sensor mat can advantageously comprise a base area of less than 2 m×2 m, preferably of less than 1.5 m×1.5 m or less than 1 m×1 m, particularly preferably of less than 1.1 m×0.8 m or less than 0.7 m×0.7 m. Preferably, the sensor mat can be embedded in a limiting element of a room. In particular, the surface sensor system can comprise a floor sensor system for monitoring the room of the building. In addition or alternatively, it may be provided that the sensor mat can be partially or completely arranged in a wall of the room in order to emit the heat on the wall side. It is also conceivable that the base unit comprises a square base area. This can improve the handling and reduce the sensitivity to kinking.

The base unit is preferably designed as a film-like, in particular moisture-impermeable, composite. By the fact that the base unit is flexible, it can be understood that the base unit can be at least partially bent without destroying the functionality of the sensor mat. The first carrier element can preferably form a base body on which the sensing means is arranged. The fact that the sensing means is arranged on the second base side of the first carrier element can be understood in the sense of the present invention to imply that the sensing means is arranged, preferably fixed, directly or indirectly on the first carrier element. It is thus conceivable, for example, that further components of the sensor mat are arranged between the first carrier element and the sensing means and that the sensing means is only indirectly provided on the second base side. The term 'on the second base side' thus refers in particular to the orientation in relation to the first carrier element. Preferably, however, the sensing means can be arranged directly on a surface of the second base side of the first carrier element. In particular, the first carrier element can form a board for the sensing means and/or further components of the sensor mat.

The fact that the base unit can be laid flat for the design of the surface sensor system can be understood, in particular in the sense of the present invention, as meaning that at least the first carrier element and the sensing means form an assembly unit which can be pre-installed, in particular before installation on the construction site. Thus, in particular, the first carrier element and the sensing means can be laid flat together. The flat laying can be understood in particular to mean that the base unit can be arranged on a structural element of the building and/or the room, in particular in such a way that the flat extension of the first carrier element extends parallel or substantially parallel to the structural element of the room and/or the building. Preferably a plurality of sensor mats can be laid next to each other on the structural element of the building in order to form the surface sensor system.

Thus, at least part of a surface sensor system can be easily formed by the sensor mat according to the invention. For this purpose, the base unit can be laid flat as an assembly unit, wherein in particular the first carrier element and the sensing means can be pre-installed. This simplifies the installation of the surface sensor system considerably, since, for example, particularly advantageous structures of the sensing means can already be specified together with the base unit and the installer can only adapt the base unit to the conditions of the room or building. In addition, the sensor mat can be pre-fabricated in a separate production environment, so that the sensor mat can be delivered as a whole to the respective construction site of the building. This results in shorter installation times on site, so that the costs for the surface sensor system or the installation of the surface sensor system can be reduced. In particular, the sensor mat can be produced in a series production.

The sensor mat can be used, for example, to monitor a room to see if a person enters it, for example if the occupant of the room is on holiday. It is conceivable, for example, that the detection of a person could provide a monitoring functionality of the sensor mat, which determines whether a person is in the room and/or moves in the room, in particular in a certain way. It is also conceivable that, for example, the sensor mat could be used in a health care region, for example in a retirement home, to detect whether an occupant of the room is moving and, if necessary, to initiate countermeasures if the occupant does not move for a long period of time.

It is further conceivable that in the case of a sensor mat according to the invention, the sensing means is in a firmly-bonded connection to the first carrier element, in particular wherein the sensing means is printed onto the first carrier element, preferably by means of screen printing. Thus, even if the sensing means is present, series production of the sensor mat with increased functionality may be favored. At the same time, a firmly-bonded connection between the carrier element and the sensing means offers a simple possibility to ensure a safe connection. As an alternative to an imprint, the sensing means can also be welded, glued or similar to the first carrier element in order to connect the sensing means with the first carrier element in a firmly-bonded connection. In addition or as an alternative to a firmly-bonded connection, it is further conceivable that the sensing means is connected to the first carrier element in a form-fit and/or force-locking manner, wherein, for example, a wire of the sensing means may be interwoven with the first carrier element or the sensing means may be riveted to the first carrier element.

Advantageously, in the case of a sensor mat according to the invention, it can be provided that the sensing means comprises at least two, preferably four, sensor elements each comprising a sensing region. In particular, the sensing regions may differ at least in some regions. It is also conceivable that the sensing means comprises further sensor elements with further sensing regions. The sensing regions enable an increase in the accuracy of the detection of the event and/or the range of possible detectable events. Thus, it is conceivable that the event detects a change in the sensing regions over time, so that a movement of a person can be inferred. It is also conceivable that a person moves in a certain direction over the sensor mat, which can be detected by the sensing regions when the person leaves one sensing region and enters another sensing region. In addition or alternatively, the sensing regions can be used to mutually validate a signal from the detection of the event to reduce measurement errors. Furthermore, it is conceivable, for example, that the event is detected in each of the sensing regions and thus the actual presence of the event can be inferred. In addition, the at least two sensor elements can ensure that the sensor mat can be cut to size, for example to adapt to the geometry of the room, without completely losing the function of the sensing means. Thus, it may be provided that one of the sensor elements will still function even if another sensor element is separated from the sensor mat, for example to take into account a corner of a room or a limitation of the room. Four sensor elements have proven to be particularly advantageous because they can be easily connected to a central evaluation unit. Furthermore, a division into four sensor elements comprises a positive effect on the manageability of the sensor mat in terms of size as well as the ability to be cut to size. The sensor elements can preferably comprise a base area of greater than or equal to 200 mm×200 mm, preferably greater than or equal to 300×300 mm.

Within the scope of the invention, the sensing means may further comprise at least one electrode for capacitive detection of the event. Thus, at least part of a capacitance may be formed by the sensing means, in particular part of a plate capacitor. The electrode can thereby act together with a part of the body of a person, whereby the part of the body of the person being able to form the counter-electrode for producing the capacitance. A change in capacitance may thus indicate the movement of the person. Capacitive detection of the event enables the execution of the detection in a simple way, for example through a floor cover in the case of a floor sensor system. Thus, the detection can be based on an electric field, which in particular can act through at least one structural element of the building. Furthermore, capacitive detection can provide a low-energy option for monitoring at least part of the room. In particular, at least one electrode can be assigned to each sensor element.

In the case of a sensor mat according to the invention, it may also be provided that the sensing means comprises at least two electrodes, in particular for capacitive detection of the event, by which an electric field can be jointly generated. Thus, for example, it is not necessary for the body part of a person to be detected, to form part of the capacitance. Rather, an electric field can already be generated, in particular by the sensor elements, wherein the presence of a person in the electric field can cause a change in the electric field. This can further increase the accuracy of the sensing means for detection. Furthermore, the sensing means can thereby be less sensitive to interference effects of other structural elements of the building, such as a functional cover and/or a visual cover of the room and/or a floor. In particular, at least two electrodes can be assigned to each sensor element.

Furthermore, it is conceivable that the sensing means comprises an electrode which is designed as a shield electrode for limiting an electric field. In particular, one of the two electrodes, by which the electric field can be generated, can be designed as a shield electrode. By means of the shield electrode, the electric field can be shielded from the outside and spread at least substantially within the limitation of the shield electrode and/or be protected at least substantially by the limitation of the shield electrode against external influences. The accuracy of the measurement, in particular the capacitive measurement, by the sensing means can thus be improved. Preferably, the shield electrode may be formed on one edge of the sensing means and/or around a plurality of electrodes, in particular around each of the sensor elements, at least substantially, in particular completely circumferentially. This allows an advantageous shielding of the sensing means and/or each of the sensing regions to be realized.

In the case of a sensor mat according to the invention, it is also conceivable that, in particular on the first and/or second base side of the first and/or second carrier element, a sound insulation layer is arranged. The sound insulation layer can serve in particular to absorb impact sound. If a sensing means is present, sound bridges of the sensor elements can be reduced or avoided by the sound insulation layer. Impact sound can be understood to be sound which can be caused by the movement of a person on a floor. This sound in particular can be attenuated by the sound insulation layer. The sound insulation layer can comprise a fiber board, foam and/or fleece. Thus, the sensor mat can simultaneously guarantee a functionality of the floor, by which at least a part of the floor is decoupled with regard to sound. This can have a positive effect on a person's perception of impact sound on the floor. Preferably, the sound insulation layer can be arranged on the base unit, in particular directly on the base unit.

Within the scope of the invention it may further be provided that, in particular on the first base side of the first carrier element and/or on the second carrier element, a sealing layer is arranged on the base unit. Preferably, the sealing layer may comprise at least one fiber layer. Preferably, the sealing layer can extend flat over the entire or substantially the entire base unit. By the term 'substantially', it can be understood that only some edge regions are free of the sealing layer in order to guarantee a connection, for example with further sensor mats. The sealing layer is preferably used to prevent moisture from the room from reaching the base unit, or at least to reduce the amount of moisture reaching the base unit, in order to protect the electrical components of the base unit from moisture and/or possible corrosion. This can be particularly advantageous if, for example, the sensor mat is to be installed in a damp room, such as a bathroom. The sealing layer and/or the sound insulation layer can also be prefabricated on the base unit and delivered to a construction site together with the base unit. Thus, further installation can be avoided at the construction site and/or series production, in particular off-site, can be favored.

Preferably, the sealing layer of a sensor mat according to the invention can comprise a non-woven fabric. The non-woven fabric can be inexpensive to produce and at the same time provide a high sealing functionality with good compatibility with other surrounding materials. In particular, the non-woven fabric can also simultaneously absorb impact sound, so that further advantages can result when using the sensor mat in a floor sensor system. Furthermore, the non-woven fabric can also be used on site as well as be easy to process away from the construction site.

Within the scope of the invention, it is further conceivable that the sealing layer and/or the sound insulation layer is fixed to the base unit with an adhesive layer. Preferably, both the sealing layer and the sound insulation layer can be fixed to the base unit with an adhesive layer each. The adhesive layer may in particular comprise a double-sided adhesive tape. The adhesive layer can be used to easily fix the sealing layer and/or the sound insulation layer to the base unit, while at the same time facilitating series production. In particular, in combination with a double-sided adhesive tape, this simplifies to mount the sealing layer and/or the sound insulation layer on the base unit. At the same time, the adhesive layer can be used, for example in an edge region, to enable two adjacent sensor mats to be connected to each other in a simple manner when designing the surface sensor system, without the need for further aids.

Advantageously, in the case of a sensor mat according to the invention, the base unit is bendable, in particular wherein an achievable bending angle of the base unit is greater than or equal to 10°, preferably greater than or equal to 45°, particularly preferably greater than or equal to 90°. The achievable bending angle can in particular be understood as a permissible bending angle which does not destroy or substantially impair the function of the sensor mat. It may be provided that the base unit comprises a bending radius when bent. In particular, an achievable bending angle must therefore be distinguished from a kinking of the base unit. Due to the high flexibility of the base unit and the bendability, a simple installation and a high robustness of the sensor mat during transport and installation can be guaranteed. For example, it may not be necessary to carry the sensor mat with special care with a plurality of people. In particular, for example, a stack of sensor mats can be delivered to the construction site and a sensor mat can be removed from the stack by one person.

Within the scope of the invention, it is further conceivable that the sensor mat forms a sensor module which can be connected together with further sensor modules for the design of the surface sensor system. A sensor module can thus be understood as an assembly unit which, together with other assembly units, forms the surface sensor system. Thus, the sensor mat can only form a part of the surface sensor system, wherein a plurality of sensor mats, in particular in combination with further components, can form the surface sensor system. It is conceivable, for example, that each sensor module comprises a manually manageable dimensioning and can thus be conveniently handled on the construction site. Depending on the geometry of the room, the design as a sensor module also offers the advantage that the surface sensor system can be adapted to the size of the room by varying the number of installed sensor modules.

Within the scope of the invention it is further conceivable that an electrical heating means is provided for emitting heat, in particular wherein the base unit comprises the electrical heating means. Thus, in addition to the sensor functionality of the sensor mat, the functionality of the sensor mat can be extended in such a way that at the same time a heating function is provided by which the room can be heated. Preferably, the heating power of the electrical heating means can be up to 1 kW/m$^2$, preferably up to 300 W/m$^2$, in particular preferably between 150 and 300 W/m$^2$ or 120 to 200 W/m$^2$. In particular, in order to favor the flexibility and simple installation of the flexible base unit, the first carrier element may comprise a thickness of up to 2 mm, preferably up to 1 mm, particularly preferably approximately 0.5 mm. For the purpose of the present invention, the indication 'approximately' can be understood as a deviation within the usual tolerances. In particular, it is further conceivable that for the intended use of the sensor mat, the electrical heating means for forming the surface heating system can be arranged on the floor side and the sensing means can be arranged above the electrical heating means. Preferably, the electrical heating means can emit the heat through the sensing means or past the sensing means, so that both functionalities of the sensor mat can be ensured in an advantageous way in a layered compound of the sensor mat.

Preferably, in the case of a sensor mat according to the invention, it may be provided that the base unit comprises a second carrier element on which the electrical heating means is arranged, in particular wherein the heating means and/or the sensing means is arranged between the first and the second carrier element. In this way, the heating means and the sensing means can be arranged independently of one another and/or separately from one another. By the arrangement of the heating means and/or the sensing means between the first and the second carrier element, the heating means and/or the sensing means is at least partially protected by the first and second carrier element. Thus, on the one hand, the carrier elements can each provide a base to which the heating means and the sensing means can be applied, preferably printed. On the other hand, protection against environmental influences can also be guaranteed. The heating means is preferably arranged on a first base side of the second carrier element, wherein the second base side of the first carrier element and the first base side of the second carrier element face each other. This allows the heating means and the sensing means to be arranged between the first and second carrier element. Preferably each of the carrier elements can comprise a thickness of less than or equal to 1 mm, preferably less than or equal to 0.5 mm, more preferably less than or equal to 0.1 mm.

Within the scope of the invention, it may further be provided that an intermediate element is arranged between the first and second carrier element, by means of which the first carrier element is at least partially, preferably completely, spaced apart from the second carrier element. By means of the intermediate element, the heating means can be electrically insulated from the sensing means and/or spatially separated from the sensing means. Furthermore, disturbance variables between the heating means and the sensing means can be reduced or avoided. In particular, the accuracy of the sensing of the event by the sensing means can thus be improved if the heating means is at a distance from the sensing means. Preferably, the intermediate element is designed as a sound insulation layer. Thus, the intermediate element can take over a plurality of functions. Firstly, impact sound can be damped by the intermediate element. On the other hand, the distance between the heating means and the sensing means can be realized by the intermediate element. Preferably, an adhesive layer can be arranged between the intermediate element and the first carrier element and/or between the intermediate element and the second carrier element. It is also conceivable that the intermediate element is designed as an insulating layer for thermal insulation.

Within the scope of the invention it may further be provided that the electrical heating means is arranged on the first base side of the first and/or second carrier element in such a way that the base unit can be laid flat for the design of a surface heating system. Thus, in addition to the surface sensor system, a surface heating system can also be provided by the sensor mat and can be formed together when the base unit is laid flat. Thus, for example, the room can be heated over a larger, in particular over the entire, surface. In particular, the sensor mat can also form a heating module which, together with further heating modules, forms the surface heating system. The arrangement of the electrical heating means on the first base side can also be provided directly or indirectly on the first and/or second carrier element. In particular, the electrical heating means can thus be laid flat together with the sensing means and the first and/or second carrier element. The electrical heating means can thus comprise the same advantages as those already explained with respect to the sensing means or the base unit with regard to simple installation, while at the same time increased functionality of the sensor mat can be guaranteed by the electrical heating means.

Within the scope of the invention it is further conceivable that the electrical heating means is in a firmly-bonded connection to the first and/or second carrier element. In particular, the electrical heating means can be directly or indirectly printed onto the first and/or second carrier element, preferably by means of screen printing. This can further simplify series production of the sensor mat. The firmly-bonded connection of the electrical heating means can be provided directly or indirectly with the first and/or second carrier element. For this purpose, the electrical heating means can be directly connected to the first and/or second carrier element or intermediate components, in particular layers, can be provided which are also connected to the first and/or second carrier element in a firmly-bonded manner. By a firmly-bonded connection of the electrical heating means and the carrier element, a high strength of the base unit can also be achieved, so that the electrical heating means and the first and/or second carrier element cannot be separated easily on the construction site. By a pressure of the electrical heating means on the first and/or second carrier element, the electrical heating means can further be precisely positioned on the first and/or second carrier element and also the geometry of the electrical heating means can be precisely specified. Screen printing offers a convenient way to provide conductive structures on the first and/or second carrier element. In particular, the electrical heating means can thus comprise a printable material. In addition or alternatively, the electrical heating means can be connected to the first and/or second carrier element in a form-fit and/or force-locking manner.

In the case of a sensor mat according to the invention, it is further conceivable that the electrical heating means comprises at least one resistor element, preferably extending on the first base side of the first and/or second carrier element. Preferably, the resistor element can be designed flat, preferably plate-like. The heating power of the electrical heating means can thus be provided by the resistor element, wherein the heating power can vary depending on the electrical resistance of the resistor element. Furthermore, by means of a flat, preferably plate-like, design of the resistor element, a constant heating power can be achieved over a large region of the sensor mat, while at the same time a thickness of the resistor element, i.e. in particular an extension in a perpendicular direction to the first base side of the first and/or second carrier element, can be kept small. This, in turn, favors the arrangement of the sensor mat, for example, in a floor of the room, so that the floor may not be raised or only slightly raised due to the sensor mat. It is also particularly advantageous that the electrical heating means can be arranged directly on the first and/or second carrier element. This can simplify the production of the sensor mat considerably.

With a sensor mat according to the invention, it is also conceivable that the resistor element comprises a cured carbon paste. Preferably, the carbon paste may comprise a carbon and/or a filler. The ratio of carbon to filler can preferably be between 25 and 75% by weight of the carbon paste. In particular, the carbon paste may contain a ground carbon in powder form. In particular, the carbon paste can be printed in a simple manner on the first and/or second carrier element, so that a firmly-bonded connection, for example between the electrical heating means and the first and/or second carrier element, can be easily produced. Such a carbon paste is also particularly suitable for screen printing and for adhesion to plastics. Thus, the first and/or second carrier element can be produced of a favorable material and at the same time a firmly-bonded connection with the resistor element can be favored. The filler can be used to adjust the heating power of the carbon paste or the resistor element. In particular, the heating power of the carbon paste may vary during production of the carbon paste, e.g. depending on a supplier or production of the carbon. In order to still achieve a given heating power within a given tolerance, the filler can be added to reduce or increase the conductivity of the carbon paste.

The invention may also provide that a temperature sensor is provided for calibrating the electrical heating means.

Preferably, the temperature sensor may be arranged on or adjacent to the base unit. By means of the temperature sensor, for example, the electrical heating means can be calibrated when the sensor mat is put into operation, wherein the heating power can be adapted to the environmental conditions. In particular, a reference temperature can thus be set which the electrical heating means should reach in order to achieve a certain room temperature assigned to the reference temperature. Furthermore, the temperature sensor can also be used to adjust the electrical heating means when the sensor mat is in operation. For example, depending on the current temperature, it may be provided that the electrical heating means is supplied with more or less power. The temperature sensor can preferably comprise a thermocouple or an NTC resistor. Thus, the temperature sensor can be designed small in order to keep the installation space requirement of the sensor mat low. It is also conceivable that the temperature sensor is arranged in a flush-mounted device in which a control unit can also be arranged, for example. Thus, a central temperature sensor can be provided for the surface heating system, wherein the temperature sensor can be provided for the sensor mat, and preferably for further sensor mats.

In the case of a sensor mat according to the invention, it may further be provided that the first and/or second carrier element comprise a plastic, preferably a thermoplastic, particularly preferably a polyester, or consist of a plastic, preferably a thermoplastic, particularly preferably a polyester. As already described above, a plastic offers a simple and inexpensive possibility of providing a firmly-bonded connection with the resistor element of the electrical heating means. In particular, the first and/or second carrier element can comprise a polyethylene terephthalate (PET) or consist of a polyethylene terephthalate (PET). Thus, the first and/or second carrier element can be produced in a simple manner, for example in the form of a film. This can in turn have a positive effect on simple series production, since the first and/or second carrier element can be produced as, for example, as a strip material and can be cut to size depending on the dimensions of the sensor mat. In addition, a plastic offers good resistance to environmental conditions, in particular to corrosion or similar. Thus, the formation of the first and/or second carrier element by means of plastic can simultaneously provide a chemical resistance of the first and/or second carrier element and thus at least partially of the base unit to building materials, for example of a floor of the room. In particular, the first and second carrier element can be of the same material.

In the case of a sensor mat according to the invention, it is also conceivable that the electrical heating means is at least partially covered by a first electrically insulating protective layer and/or the sensing means is at least partially covered by a second electrically insulating protective layer. In particular, the first and/or second electrically insulating protective layer may be part of the base unit. Thus, in particular, a simple series production of the base unit is possible if, for example, the electrical heating means and/or the sensing means is printed on the first carrier element and then covered with an electrically insulating protective layer. The first and/or second electrically insulating protective layer may preferably comprise a polymer, in particular a photoresist. In particular, the first and/or second electrically insulating protective layer may be printed on the first carrier element and/or the heating means and/or the sensing means in order to provide a protective effect. By using a photoresist for the first and/or second electrically insulating protective layer, the production of the sensor mat can be simplified, for example, in that the photoresist is applied in liquid form and is cured by exposure, in particular ultraviolet exposure. In particular, the photoresist can thus be a negative resist.

Within the scope of the invention it is further conceivable that the base unit comprises at least one electrical connection, in particular for connection to an energy source and/or to a control unit. Preferably, the electrical connection may comprise a connection means for reversibly connecting the electrical heating means and/or the sensing means to the energy source and/or the control unit. By means of the electrical connection, an interface can be made available in a simple manner by which the sensor mat can be connected to an energy source and/or a control unit. The connection to the energy source and/or to the control unit can be provided indirectly, wherein, for example, further sensor mats can be connected in between. For improved electrical contact, the connection means can preferably be connected to the base unit by means of an electrically conductive adhesive. The reversible connection of the electrical heating means to the energy source and/or the control unit can further simplify the installation of the sensor mat for designing the surface heating system. For example, the electrical connection may include a push-button and/or an eyelet to ensure the reversible connection of the electrical heating means to the energy source and/or the control unit. In particular, the reversible connection also makes it possible, for example in the event of incorrect installation, to ensure easy release, in particular non-destructive release, which can further simplify the installation of the surface heating system as a whole. Furthermore, it is conceivable that the connection means comprises an electrical contact, in particular an exposed one, on the base unit.

Furthermore, in the case of a sensor mat according to the invention, it may be provided that the electrical connection comprises a connection interface for connecting the electrical heating means and/or the sensing means to a connection unit for connecting the connection interface to a counter-connection interface, in particular wherein the connection interface comprises at least one alignment means by which a mal-positioning of the connection unit can be prevented. The alignment means may comprise openings and/or projections which correspond to a positioning aid of the connection unit. In particular, the connection unit may be provided as an additional assembly which is added only when the surface heating system is installed. The connection unit can be used to create a simple, construction site-specific connection option. A plurality of, preferably three, openings can be provided. With an appropriate arrangement of the alignment means, only a correct or a correct and an obviously or conspicuously wrong position of the connection unit at the connection interface can be possible. The connection interface can advantageously be designed to be connected to the connection unit in a force-locking, firmly-bonded and/or form-fit connection. In particular, the connection interface can be designed for a magnetic connection with the connection unit. For this purpose, the connection interface can comprise a magnet or a magnetizable material. This can create a particularly simple and, in particular, construction site compatible connection possibility.

Furthermore, it may be provided within the scope of the invention that the connection interface comprises a recess in the base unit for receiving the connection unit, in particular wherein the recess is at least partially limited by the first and/or second carrier element. The recess may in particular comprise a cut-out from the intermediate element and the first and/or second carrier element. In this way a simple receptacle for the connecting unit can be created. In recesses to which no connection unit is to be attached, a dummy piece may be provided by which the connection interface is protected. If the recess is limited by the first, preferably the second, carrier element, a connection means in the form of an electrical contact may be provided on the first and/or second carrier element so that the connecting unit can easily be brought into electrical contact with the sensor mat. It is also conceivable that the first and/or second carrier element is magnetically clamped in the connection unit. This can improve electrical contact and fixation of the connection unit to the sensor mat.

The invention may further provide that the electrical connection comprises a heating connection which is connected to the electrical heating means and/or a data connection which is connected to the sensing means. Preferably, the electrical connection may comprise a heating connection and a data connection. However, it is also conceivable that the heating connection and the data connection are spatially separated, in particular arranged on different sides of the sensor mat. Through the heating connection, it may be possible to supply the electrical heating means with energy. It is also conceivable that the electrical heating means is also controlled by the heating connection. The control can be provided, for example, by switching a current on or off at the electrical heating means. The data connection can also be used to enable the sensing means to communicate with the control unit. In particular, the data connection can also be used to ensure that the sensing means is supplied with energy. Thus, a voltage can be applied to the heating connection and/or the data connection. In particular, the heating connection and the data connection can be provided together at the electrical connection, so that the connection of the sensor mat to further sensor mats and/or to a control unit and/or to an energy source can be accomplished intuitively in a simple way, while the installer can concentrate on the electrical connection. In particular, this can simplify installation to the extent that the error rate when connecting the sensor mat can be reduced.

In the case of a sensor mat according to the invention, it is further conceivable that the electrical connection is arranged in an edge region of the base unit, in particular wherein the electrical heating means is connected to the electrical connection by at least one conductor track and/or wherein the electrical heating means is arranged in a central region of the first and/or second carrier element. The arrangement of the electrical connection in the edge region of the base unit can thus enable simple connection of the base unit and/or the sensor mat without impairing the functionality of the heating means and/or the sensing means. A connection between the heating means and the electrical connection can be made in a simple manner by means of the conductor track. By arranging the electrical heating means in the central region of the first and/or second carrier element, it can also be designed for a flat functionality of the heating power. An overlapping of a plurality of resistor elements, when arranging a plurality of sensor mats next to each other, is not necessary if the electrical connection and the electrical heating means are spatially separated.

Within the scope of the invention, it may further be provided that the electrical heating means comprises a heating conductor element by which the resistor element is connected to the conductor track. In particular, the heating conductor element can be arranged directly on the first and/or second carrier element. The heating conductor element can preferably comprise a different material than the resistor element. The heating conductor element can preferably comprise a noble metal, preferably silver. This means that the heating conductor element can comprise a lower resistance than the resistor element, so that the losses due to electrical resistance can be kept low by contacting or electrically coupling the electrical heating means with the conductor track, and thus the resistor element comprises the decisive part of the heat development and energy absorption. In order to achieve a particularly simple design, the heating conductor element can, for example, be arranged directly on the first and/or second carrier element and the resistor element directly on the heating conductor element. Thus, in particular, a firmly-bonded connection of the heating conductor element with the first and/or second carrier element and/or the resistor element can be provided. This means that the sensor mat can comprise only a small overall thickness and at the same time the design can be kept simple.

It is advantageous that, with a sensor mat according to the invention, the conductor path can be in a firmly-bonded connection to the first and/or second carrier element. In particular, the conductor path can be printed onto the first and/or second carrier element. In particular, the conductor track can be applied to the first and/or second carrier element by means of screen printing. This ensures a secure connection of the conductor track to the first and/or second carrier element, while at the same time series production of the sensor mat can be simplified.

Within the scope of the invention, it is further conceivable that the conductor path, in particular in the edge region of the base unit, is arranged circumferentially around the first and/or second carrier element. This allows the sensor mat to be easily adapted to room geometries by cutting it to size without, for example, completely destroying the functionality of the heating means. Thus, for example, individual resistor elements can be cut off while other resistor elements are still functioning, as these can preferably be connected to the conductor track with a plurality of heating conductor elements or can be connected to the surrounding conductor track at a plurality of points.

It may be advantageous in the case of a sensor mat according to the invention that a plurality of sensor elements of the sensing means are arranged in a regular distribution pattern, in particular on the second base side of the first carrier element. This can result in an advantageous monitoring functionality of the sensing means, wherein, on the one hand, an assignment of the individual sensor elements in the room can be simplified if the distribution pattern is regularly formed, and, on the other hand, cutting the sensor mat to size can also be favored. Furthermore, a plurality of sensor elements can form overlapping or adjacent sensing regions which can be used for validation during the detection of an event. Thus, by laying a single sensor mat, a plurality of sensor elements can be laid at the same time, so that the installation of the surface heating system can be simplified overall, in particular accelerated. Additionally or alternatively, it may be provided that a plurality of resistor elements of the electrical heating means are arranged in a regular distribution pattern, in particular on the first base side of the first carrier element. The resistor elements can thereby favor a cuttability of the sensor mat and/or enable a homogeneous heat distribution over a surface of the sensor mat.

Within the scope of the invention it is further conceivable that the sensing means is connected to at least one decentralized evaluation unit, in particular for processing sensor data of the sensing means. Preferably, the decentralized evaluation unit is electrically and/or mechanically connected to a data line of the base unit by means of electrically conductive adhesive. The decentralized evaluation unit can thus be part of the sensor mat and preferably be pre-installed on the base unit. With the decentralized evaluation unit, it is possible to tap the sensor data close to the sensor elements or the sensing element, so that no or only slight losses occur during the transmission of the sensor data. This can comprise a positive effect on the accuracy and/or reliability of the sensing means, in particular in the case of capacitive sensing. The decentralized evaluation unit can preferably comprise an analog-digital converter, in particular on a circuit board. Thus, for example, it can be provided that the decentralized evaluation unit converts analog sensor signals into digital signals and transfers them to a central control apparatus. Thus, the required installation space of the evaluation unit can be small, but at the same time an increased accuracy and/or reliability can be provided. In particular, each of the sensor elements of the sensing means can be connected to a respective decentralized evaluation unit. This means that a respective sensor signal can be tapped and at least partially processed in the, in particular, direct vicinity of the sensor elements, so that losses during transmission can be kept low. Additionally or alternatively, the decentralized evaluation unit can be connected to each of the sensor elements of the sensor mat. Thus, one decentralized evaluation unit per sensor mat can be sufficient to process the sensor data of all sensor elements of the sensor mat. On the one hand, this comprises the advantage that the lines for the, in particular, analogue sensor data up to the decentralized evaluation unit can be kept short, and at the same time only one decentralized evaluation unit is used per sensor mat. The decentralized evaluation unit can preferably comprise a printed circuit board, a processor, in particular a microprocessor, and/or other electronic structural elements. Preferably, the decentralized evaluation unit can be covered with a casting compound, which, in particular comprises a synthetic resin, or consists of a synthetic resin. This can protect the electrical components of the decentralized evaluation unit.

With a sensor mat according to the invention, it is also conceivable that the sensing means and/or the decentralized evaluation unit can be connected to a central control apparatus. In particular, any decentralized evaluation unit can be connected to the central control apparatus. In this way, the data can be transferred from the decentralized evaluation unit to the central control apparatus in a simple manner, wherein, as described above, the decentralized evaluation unit can be designed in a simple manner, while complex computing operations, for example, can be executed by the central control apparatus. This means that the computing capacity can be concentrated in the central control apparatus, for example. Preferably, the central control apparatus is part of a control unit through which, for example, the electrical heating means can also be controlled.

Advantageously, in the case of a sensor mat according to the invention, the central evaluation unit can be arranged on the first base side or the second base side of the first and/or second carrier element on the base unit. Preferably, the decentralized evaluation unit can be at least partially embedded in the sound insulation layer. Thus, the sound insulation layer can simultaneously comprise a protective effect for the evaluation unit, so that if the sensor mat is stressed in the region of the decentralized evaluation unit, the sound insulation layer can yield slightly so that the stress cannot completely affect the decentralized evaluation unit. Furthermore, embedding the decentralized evaluation unit in the sound insulation layer can ensure that the installation space for designing the sensor mat is used effectively, so that the thickness of the sensor mat can be limited.

Within the scope of the invention it is further conceivable that the base unit comprises at least one data line which is in communication connection with the sensing means and/or with the decentralized evaluation unit. The data line may in particular be provided separately from the conductor track and enable the sensing means to be connected to the data connection. In this way a connection possibility can be created in a simple manner, through which data of the sensing means can be transported to further components of the surface heating system. In particular, the data line can be arranged on the first and/or second carrier element. This can create a simple connection possibility if the connection interface comprises a recess. It is thus conceivable that the data line is arranged on the first base side of the second carrier element so that electrical contact at the electrical connection for the heating means and the sensing means via the second carrier element can be realized.

Furthermore, with a sensor mat according to the invention, it is conceivable that the decentralized evaluation unit extends at least partially into a receiving opening of the intermediate element. Thus, the decentralized evaluation unit can be embedded e.g. in the intermediate element and at least partially be protected from external influences by the intermediate element. Furthermore, a thickness of the sensor mat can be kept small if the decentralized evaluation unit does not or only partially protrude from the base unit. For example, the receiving opening can be cut into the intermediate element. Additionally or alternatively, it can be provided that at least one sensor element of the sensing means is connected to the data line through the decentralized evaluation unit. Thus, for example, a transition of the sensor data from the first to the second carrier element and vice versa can also be realized by the decentralized evaluation unit, in particular if the decentralized evaluation unit extends into the intermediate element at the same time.

Furthermore, in the case of a sensor mat according to the invention, it is conceivable that the decentralized evaluation unit and/or the heating means is electrically coupled to the electrical connection by a connection section, in particular wherein a data line and/or at least part of a conductor track is formed by the connection section. The connecting section can preferably be arranged on the first base side of the second carrier element, in particular printed on the first base side of the second carrier element. In this way a direct connection of the decentralized evaluation unit with the electrical connection can be created in a simple manner. Sensor data can be transmitted to a control unit via the connection section. Furthermore, the heating means can be supplied with current via the connection section or a potential can be applied to a resistor element of the heating means.

Preferably, in the case of a sensor mat according to the invention, it may be provided that a plurality of electrical connections, in particular for connection to an energy source and/or to a control unit, is arranged in an edge region of the base unit, in particular wherein a plurality of connection sections extend from the decentralized evaluation unit, preferably in a cross-like manner, to the electrical connections. The decentralized evaluation unit can preferably be arranged centrally on the base unit. The electrical connections are preferably arranged in an edge region of the base unit. Thus, a short distance can be achieved by the cross-like design of the connection sections. In particular, the connection sections can be connected via the decentralized evaluation unit or at least partially directly to each other. In particular, the heating conductor element can comprise connection sections that are connected to each other circumferentially. This can improve the ability to cut the sensor mat to size if a cut through one of the connection sections does not directly lead to a cut in the current supply for the resistor elements. The data line can preferably comprise separate connection sections.

Within the scope of the invention, it may be provided that a passage element is provided, which extends at least partially through the first carrier element for connecting the sensing means with the decentralized evaluation unit. The passage element may preferably comprise a rivet which is inserted into the first carrier element during the production of the base unit. However, other possibilities of connecting the two base sides of the first carrier element are also conceivable. Preferably, the passage element can be electrically conductive. This can enable the sensing means, which is preferably arranged on the second base side of the first carrier element, to be connected to an electrical component on the opposite, in particular the first base side, of the first carrier element. Thus, on the side of the first carrier element opposite the sensing means, for example, a decentralized evaluation unit can be arranged, which can be electrically coupled to the sensing means through the passage element. In this way, contact can be made through the first carrier element without, for example, laying a line along the outside of the base unit and winding it at least partially around the base unit in order to reach the other side. At the same time, the distance travelled through the passage element can be small, so that the electrical resistance and thus possible signal losses can also be low. The passage element also facilitates simple production, in particular if it is designed as a rivet, for example.

The invention may also provide that the data line comprises a ring section which runs at least partially, preferably completely, circumferentially around a central region of the base unit. Preferably, the data line may comprise a supply section which is at least partially arranged in the central region. The ring section can preferably be understood as a section of the data line which extends along the edge region of the base unit. The ring section can be round or adapted to an angular shape of the sensor mat. The ring section enables a connection of the sensing means to a data connection, even if the sensor mat is cut to size, for example, to adapt to a geometry of a room. In particular, the supply sections connect the ring section with the sensing means and/or the decentralized evaluation units, which are preferably arranged in the central region of the base unit.

Advantageously, the data line can be connected to a data connection that is accessible from outside the base unit. Preferably, the data line can be connected to the central control apparatus through the data connection. Thus, the data connection can ensure that the sensing means and/or the decentralized evaluation unit can be connected to the central control apparatus. This can be done indirectly, for example, by connecting a plurality of sensor mats to each other via different data connections and finally connecting at least one of the sensor mats to the central control apparatus.

Preferably, with a sensor mat according to the invention, the data line can be connected via the ring section to a plurality of data connections, which are arranged in an edge region of the base unit. In particular, the data connections can be part of electrical connections in the edge region of the base unit. The fact that the data line is connected via the ring section to a plurality of data connections further facilitates the possibility of cutting the sensor mat to size. In particular, this means that regions in which a connection is provided can also be cut off without significantly impairing the functionality of the sensing means. Thus, for example, it may only be necessary to leave one data connection if the sensor mat is adapted to a geometry of the room by cutting.

In the case of a sensor mat according to the invention, it is also conceivable that the electrical heating means and/or the conductor track and/or the data line and/or the sensing means comprises a noble metal, in particular silver. It is thus conceivable, for example, that a heating conductor element of the electrical heating means and/or a sensor element of the sensing means comprises the noble metal, in particular silver. A low resistance of the respective component can be ensured by the noble metal, so that the electrical power is not or at least reduced unintentionally, emitted in the form of heat. In particular in the region of the sensing means, a measurement result of the detection of the event can also be improved in its accuracy and/or reliability. Furthermore, for example a silver can be processed in a simple way in a printing method, so that a simple production of the sensor mat can be improved, for example by printing individual components.

It is further conceivable that a sensor mat according to the invention comprises at least one nominal cutting line, along which it is possible to cut the sensor mat for adaptation to a geometry of the room without completely destroying the function of the heating means and/or the sensing means, in particular wherein a part of the heating means and/or sensing means can be separated along the nominal cutting line during cutting. By the nominal cutting line can be understood a region, along which an advantageous cutting possibility is created so that the function of the heating means and/or the sensing means is not completely destroyed. Preferably, the nominal cutting line can be pre-drawn and/or pre-perforated so that an installer can quickly identify the nominal cutting line. In particular, a plurality of nominal cutting lines can be provided. This can further increase the flexibility in the installation of the sensor mat. Furthermore, the nominal cutting lines can result, for example, from the arrangement of the sensor elements of the sensing means and/or the resistor elements of the heating means, in particular if the sensor elements and/or the resistor elements are arranged in a regular pattern.

According to another aspect of the invention, a surface sensor system is claimed for detecting an event in a room of a building. At least one sensor mat according to the invention is laid flat on a structural element of the building.

Thus, an inventive surface sensor system comprises the same advantages as those already described in detail with regard to an inventive sensor mat. The structural element of the building can preferably be understood as a carcass component, in particular a carcass floor. For example, it is conceivable that the sensor mat according to the invention is placed on the structural element and then covered with a functional and/or visual cover of the floor to be produced. In particular, the surface heating system may comprise a plurality of inventive sensor mats which are connected to each other. The surface sensor system can also be designed as a floor sensor system. In this case, the surface sensor system can be laid in a simple manner and at the same time, with only a small thickness, it can also take up a correspondingly small amount of installation space within the building, so that other components of the building are not or only slightly influenced by the sensor mat or the surface sensor system. Preferably, the surface sensor system can also comprise a central control apparatus through which the sensor mat and/or the sensor mats can be controlled. The central control apparatus can be arranged in a flush-mounted box, for example.

According to a further aspect of the invention, a method for producing a sensor mat, preferably a sensor mat according to the invention, is claimed for a surface sensor system, preferably for monitoring a room of a building. In particular, the surface sensor system may be a surface sensor system according to the invention. The method for producing the sensor mat further comprises the following steps:

Providing a first carrier element, which comprises a flat extension with a first base side and a second base side, Constructing a flexible base unit, wherein an application of a sensing means for detecting an event on the second base side of the first carrier element is carried out, so that at least the base unit can be laid flat for the design of the surface sensor system.

Preferably, the surface sensor system can be an inventive surface sensor system. In particular, the method according to the invention thus comprises the same advantages as those already described in detail with regard to a sensor mat according to the invention. The provision of the first carrier element can preferably involve the production of a film, in particular a PET film. When applying the sensing means on the second base side, the sensing means can preferably be arranged directly on the second base side of the first carrier element or indirectly on the second base side of the first carrier element. Preferably, the application of the sensing means on the second base side of the first carrier element can establish a firmly-bonded connection of the sensing means with the first carrier element. However, it is also conceivable, that the sensing means is fixed in some other way to the first carrier element or to a further component of the base unit. The event may preferably comprise activity of a person, wherein the activity may for example comprise a stay of the person in the room. In this case, the surface sensor system can be a device or a system suitable for sensing the event or a plurality of events distributed over a surface of the room.

Thus, a sensor mat can be produced in a simple way, which can also be easily installed in a room of a building to design a surface sensor system. For example, the provision of the first carrier element and the construction of the flexible base unit can be carried out at a production site separate from the construction site of the building, while the installation is finally carried out in the room itself, wherein only the sensor mat or a plurality of sensor mats are laid flat.

It is further conceivable that in a method according to the invention, the application of the sensing means comprises the following steps:

Applying a sensor material of the sensing means in at least partially liquid form on the second base side of the first carrier element, Curing the sensor material.

Preferably, the sensor material can be applied to the first carrier element by a printing method. In this way, a firmly-bonded connection can be produced in a simple and cost-effective manner. At the same time, the application of the sensor material in at least partially liquid form offers the possibility to produce the sensing means precisely in a reproducible manner.

Furthermore, in the case of a method according to the invention, it is conceivable that the method comprises the following steps:

Providing a second carrier element, which comprises a flat extension with a first base side and a second base side, Fixing the first and second carrier element together.

Preferably, the first and second carrier elements can be fixed together in such a way that the first base of the first carrier element and the second base of the second carrier element face each other. The first and second carrier element can be fixed together in a force-locking, form-fit and/or firmly-bonded manner. In this way, the base unit can be created in a simple way. The second carrier element can also provide further protection for the heating means.

Advantageously, in a method according to the invention, it can be provided that the fixing of the first and second carrier elements to each other comprises the arrangement of an intermediate element between the first and second carrier element, in particular wherein an adhesive layer is arranged between the intermediate element and the first carrier element and/or between the intermediate element and the second carrier element. By means of the intermediate element a distance between the carrier elements is achieved in a simple manner. If, for example, a heating means is arranged on the second carrier element and the sensing means is arranged on the first carrier element, mutual interference of the sensing means and the heating means can thereby be reduced. The adhesive layer can be laminated, in particular in the form of a double-sided adhesive tape, to the intermediate element and/or the first and/or second carrier element. This results in an easy fixing possibility of the intermediate element. The intermediate element can advantageously be designed as a sound insulation layer and/or as an adhesive layer itself.

The invention may also provide for the following step to be carried out before the application of the sensing means:

Pre-tempering the first and/or second carrier element.

By pre-tempering the first and/or second carrier element, shrinkage during printing of the conductor material can be absorbed. When applying the sensing means, in particular if this is realized by a printing method, the first and/or second carrier element can be heated locally so that thermal stresses occur and at least partially deform the first and/or second carrier element. On cooling, this deformation can finally be reduced, so that damage to the sensing means may occur. This can be counteracted by pre-tempering the first and/or second carrier element.

In the case of a method based on the invention, the construction of the base unit may advantageously comprise the following step:

Applying an electrical heating means for emitting heat on the first base side, in particular on the first base side, of the first carrier element and/or on the second carrier element, so that at least the base unit can be laid flat for the design of a surface heating system.

Thus, the functionality of the sensor mat can be supplemented by the functionality of the sensing means. In order to keep the need for electrical insulation to a minimum, the electrical heating means can preferably be arranged on the base side of the first carrier element opposite the sensing means. Additionally or alternatively, the heating means can be arranged on the second carrier element, in particular on a first and/or second base side of the second carrier element.

It is further conceivable within the scope of the invention that the application of the electrical heating means on the first base side of the first carrier element comprises the following steps:

Applying a conductor material of the electrical heating means in at least partially liquid form on the first base side of the first and/or second carrier element, Curing the conductor material.

The application of the conductor material may preferably comprise printing of the electrical heating means. In this way, the conductor material can be applied, preferably in atomized form, to the regions to be printed and can create a firmly-bonded connection, in particular with the first and/or second carrier element. The conductor material can be cured preferably by UV radiation or by temperature application. This can accelerate the curing of the conductor material in liquid form. The conductor material can preferably comprise a carbon and/or a filler. The conductor material can be premixed or the carbon and filler can only be mixed when the conductor material is applied. This can facilitate series production of the sensor mat, in particular since the conductor material can be applied in liquid form in a reproducible manner.

The invention may also provide that the construction of the base unit comprises at least one of the following steps:
Applying a first protective layer to the electrical heating means, in particular by varnishing, and/or
Applying a second protective layer to the sensing means, in particular by varnishing.

Preferably, the electrical heating means and the sensing means can be covered with the first and second protective layer respectively. The first and second protective layer, respectively, may provide electrical insulation so that both the functionality of the electrical heating means and/or the sensing means may be protected against external influences and the environment may be protected against current from the electrical heating means and/or the sensing means. Varnishing can provide an easy way to produce the sensor mat in series production. In particular, this can reduce production costs.

Advantageously, it may be provided that in the case of a method according to the invention, the method further comprises at least one of the following steps:
Constructing at least one connecting interface by pressing on a connection means and/or a counter-connection interface by pressing on a counter-connection means, in particular wherein the connection means and the counter-connection means are pressed on simultaneously and/or
Constructing a connection interface by cutting a recess, into which a connection unit can be inserted, into the base unit, in particular so that the first and/or second carrier element at least partially limit the recess.

In particular, the connection interface can be a connection interface for reversibly connecting the connection means with a counter-connection means. The connection means can preferably be a push-button, while the counter-connection means can preferably be an eyelet. This makes it easy to create a reversible connection possibility for the sensor mat. In addition or alternatively, the connection interface can be produced, for example, by providing a punching and/or drilling operation through which a contact can be inserted into the base unit and/or exposed on the base unit. In particular, the connection interface can also be formed in that, when the first and/or second protective layer is applied to the electrical heating means or the sensing means, a region of the electrical heating means or the sensing means is covered so that the first or second protective layer does not arise in this region. This means that the electrical heating means or the sensing means can be exposed in this region and thus allow contact. The press tool can preferably be designed to press on both the connection means and the counter-connection means. For this purpose, the press tool can be designed to receive the base unit and can comprise different punches at the respective positions in order to simultaneously press on the counter-connection means and the connection means. Furthermore, contacts for the heating means, the sensing means and/or the decentralized evaluation units can also be pressed on simultaneously with the connection means and the counter-connection means. Preferably, an electrically conductive adhesive may be applied to connect the connection means and/or the counter-connection means to the base unit. To accelerate the adhesion, the electrically conductive adhesive can be cured, e.g. thermally and/or by means of UV radiation. The connection interface can also be used to create a simple receptacle for the connection unit. In recesses where no connection unit is to be attached, a dummy piece can be inserted to protect the connection interface. If the recess is limited by the second, preferably the first, carrier element, a connection means in the form of an electrical contact may be provided on the first and/or second carrier element so that the connection unit can easily be brought into electrical contact with the sensor mat.

The invention may also provide that the method comprises the following steps:
Applying an adhesive layer to a sealing layer and/or to a sound insulation layer and/or to the base unit,
Fixing the sealing layer and/or the sound insulation layer to the base unit by the adhesive layer.

The application of the adhesive layer may preferably involve laminating the adhesive layer to the sealing layer or the sound insulation layer or the base unit. Preferably, the adhesive layer can be designed as a double-sided adhesive tape. Thus, the sealing layer and/or the sound insulation layer can be delivered as prefabricated components and can be easily attached to the base unit by means of the adhesive layer during production of the sensor mat. This can facilitate series production of the sensor mat and/or simplify production. In particular, the production of the sealing layer and/or the sound insulation layer can be outsourced.

The invention may further provide that the adhesive layer comprises an adhesive tape, the following step being further provided:
Scribing the adhesive tape so that two separately usable adhesive regions are produced, wherein a first adhesive region can be used for fixing the sealing layer and/or the sound insulation layer on the base unit and a second adhesive region can be used for external fixing of the sensor mat.

The adhesive tape can thus simultaneously favor the possibility of connecting the base unit to the sealing layer and/or the sound insulation layer and two sensor mats, which should be placed next to each other to form the surface heating system. By scribing the adhesive tape, the base unit can first be completely laminated with the adhesive tape and then, depending on the geometry of the room and/or the use of the sensor mat, the adhesive regions can be adapted, in particular to the respective application. The insertion of the adhesive tape can, for example, be carried out at the construction site, while further steps can be carried out in a separate production region of the sensor mat. In particular, however, by scribing the adhesive tape in the separate production environment, a standardized specification may already exist, which can still be changed and/or ignored on the construction site.

Furthermore, in the case of a method involving an invention, the method may comprise the following step:
Cutting at least the first and/or second carrier element and/or the intermediate element, in particular wherein the cutting is carried out simultaneously with the pressing on of the connection means and/or the counter-connection means.

In this way, for example, the outer shape of the sensor mat can be specified for series production, in particular before further components are applied to the first and/or second carrier element. Preferably, the complete base unit can be cut to size, in particular preferably together with the sealing layer and/or the sound insulation layer. Thus, for example, a geometry adapted to the application case can be produced, while the upstream production can be carried out, for example, by means of a strip material, in particular as an endless web. It is also conceivable that the cutting of the base unit is carried out in the same press tool as the pressing on of the connection means and the counter-connection means. It is thus conceivable that the outer edge of the press tool is designed as a punching tool and that press punches are provided in the inner region. In this way, different production steps can be combined in a single work step, in particular in a single stroke.

Furthermore, in the case of a method according to the invention, it may be provided that the method further comprises the following step:

Arranging at least one decentralized evaluation unit, in particular for processing sensor data of the sensing means, on the base unit, preferably wherein an electrically conductive adhesive is used for an electrical contact between the decentralized evaluation unit and a data line of the base unit.

In particular, the intermediate element can comprise an opening or an opening can be cut into the intermediate element into which the decentralized evaluation unit is inserted. The decentralized evaluation unit can be placed in the center of the base unit. On the one hand, the electrically conductive adhesive can be used to fix the evaluation unit and on the other hand, the electrical contact of the evaluation unit can be realized with the base unit, in particular with connection sections to electrical connections.

The invention may also provide that the method further comprises the following step:

Casting a casting compound at least partially via the base unit and/or the decentralized evaluation unit.

The casting compound can preferably be electrically insulating. By at least partially casting the casting compound over the base unit and/or the decentralized evaluation unit, it can be ensured that no undesirable electrical contacts remain open which could impair the functionality of the sensor mat in use. Preferably the casting compound can comprise a synthetic resin or consist of a synthetic resin.

The invention may also provide for a quality control of the heating means. In particular, the quality control of the heating means may comprise the following steps:

Placing the sensor mat on a conveyor means, in particular a conveyor belt,
Approaching at least one connection interface and/or at least one counter-connection interface with a probe,
Testing an electrical parameter, in particular the electrical resistance,
Applying a voltage to the heating means and evaluating a thermal image, in particular an infrared image, with regard to a temperature reached,
Comparing the electrical parameter and/or the temperature reached with a set-point value.

Furthermore, it is conceivable that a quality control of the sensing means is carried out in the method according to the invention. In particular, the quality control of the sensing means may comprise the following steps:

Placing the sensor mat on a conveyor means or conveying the sensor mat on the conveyor means,
Approaching at least one sensor element and/or a decentralized evaluation unit with a probe,
Positioning a test body on at least one sensor element and storing a sensing signal,
Comparing the sensing signal with a reference signal.

Preferably, the conveyor means of the quality control of the sensing means and the heating means may be the same conveyor means, so that the quality control, in particular the complete quality control, can be carried out on the same conveyor means. Quality control can increase the reliability of the method for producing the sensor mat, so that defective products can be identified and sorted out before installation on the construction site.

Further measures to improve the invention are described in the following description of some embodiments of the invention, which are shown schematically in the figures. All features and/or advantages arising from the claims, the description or the figures, including constructional details, spatial arrangements and method steps, may be essential to the invention, both individually and in various combinations. It should be noted that the figures are only descriptive and are not intended to limit the invention in any way. The figures show the following:

In the following figures, identical reference signs are used for the same technical features even from different embodiments.

DESCRIPTION OF SPECIFIC EMBODIMENTS OF THE INVENTION

Figure 1:
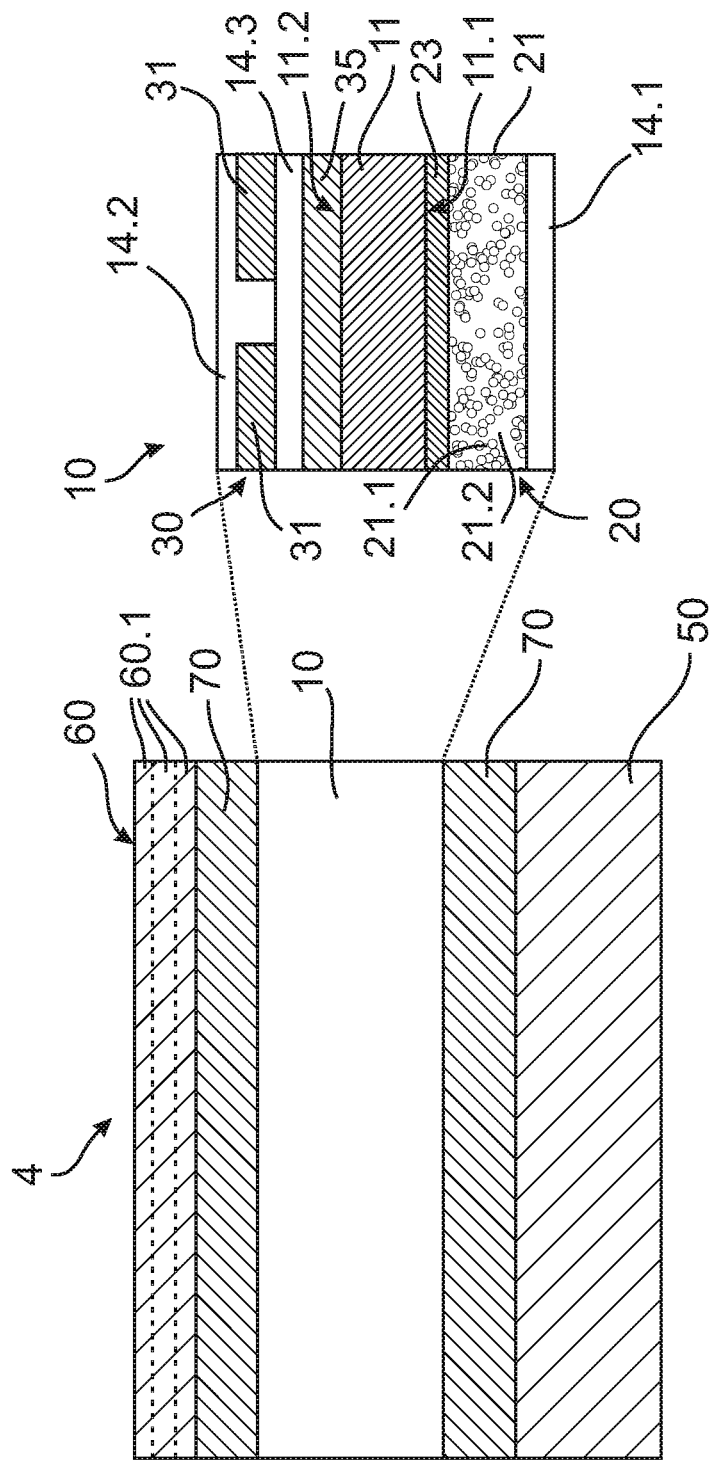
FIG. 1 a schematic design of a sensor mat according to the invention according to a first embodiment in schematic sectional view, FIG. 2 a plan view of a first base side of a base unit of the inventive sensor mat of the first embodiment, FIG. 3 a schematic representation of a sensing means of the inventive sensor mat of the first embodiment, FIG. 4 a possible sensing of an event in chronological order with the sensor mat of the first embodiment, FIG. 5 the inventive sensor mat of the first embodiment in a further schematic sectional view, FIG. 6 a further sectional schematic view of the inventive sensor mat of the first embodiment in the edge region, FIG. 7 a possible bending of the sensor mat of the first embodiment in schematic view, FIG. 8 a surface sensor system with a sensor mat according to the first embodiment, FIG. 9 a room in a building with a surface sensor system according to the invention in a further embodiment, FIG. 10 method steps of a method according to the invention for producing a sensor mat in a further embodiment, FIG. 11a, 11b, 11c, 11d, 11e, 11f, 11g, 11h and 11i the method steps of the method according to the invention of the embodiment of FIG. 10 in a further schematic representation, FIG. 12 a schematic design of an inventive sensor mat according to a further embodiment in schematic sectional view, FIG. 13 a plan view of a heating means of the inventive sensor mat according to FIG. 12, FIG. 14 a schematic representation of a sensing means of the inventive sensor mat as shown in FIG. 12, FIG. 15 the inventive sensor mat according to FIG. 12 in a further schematic sectional view, FIG. 16a, 16b and 16c the inventive sensor mat according to FIG. 12 with a connection unit, FIG. 17 method steps of a method according to the invention for producing a sensor mat in a further embodiment, FIG. 18a, 18b, 18c, 18d, 18e, 18f, 18g, 18h, 18i, 18j and 18k the method steps of the inventive method of the embodiment of FIG. 17 in a further schematic representation.

FIG. 1 shows a schematic design of a sensor mat 4 according to the invention with a detailed view of a base unit 10 of the sensor mat 4. The base unit 10 forms in particular a core of the sensor mat 4. The base unit 10 comprises a first carrier element 11 which comprises a flat extension with a first and a second base side 11.1, 11.2. Thus, the first carrier element 11 is suitable for laying the sensor mat 4, for example as part of a limiting element 110 of the room 101, in particular a floor, of a building 100. The first base side 11.1 preferably forms an underside of the first carrier element 11 if the sensor mat 4 is installed as a floor heating system in the building 100. In this case, the second base side 11.2 preferably forms the upper side of the first carrier element 11. On the first base side 11.1, an electrical heating means 20 is provided for emitting heat. The electrical heating means 20 comprises a resistor element 21 which extends on the first base side 11.1 of the first carrier element 11 and is preferably designed flat, in particular plate-like. Furthermore, the electrical heating means 20 comprises a heating conductor element 23, through which the resistor element 21 is connected to an electrical connection 40 of the sensor mat 4. The heating conductor element 23 and/or the resistor element 21 can be printed on the first carrier element 11. Preferably, the heating conductor element 23 is initially printed directly on the first carrier element 11 and the resistor element 21 is printed at least partially on the heating conductor element 23 and/or at least partially on the first carrier element 11. Thus, the resistor element 21, which can preferably be designed in a plate-like manner, can extend over the heating conductor element 23. The heating conductor element 23 can, for example, be provided as a narrow strip so that the resistor element 21 is partly applied directly to the heating conductor element 23 and partly applied directly to the first carrier element 11. In particular, the heating conductor element 23 and the resistor element 21 are in a firmly-bonded connection to the first carrier element 11 and/or to each other. In order to keep the electrical resistance of the heating conductor element 23 low, the heating conductor element 23 comprises in particular a noble metal, preferably silver. The resistor element 21 is designed to emit heat when it is energized. The heat emitted results in particular from the resistance of the resistor element 21. In particular, the resistor element 21 comprises a carbon paste which comprises carbon 21.1 and/or a filler 21.2. The carbon 21.1 can preferably be in ground form. The filler 21.2 also serves to adjust the conductivity of the resistor element 21, wherein the conductivity of the resistor element 21 corresponds to the quantity of filler 21.2 added to the carbon paste. For electrical insulation from the outside of the base unit 10, a first protective layer 14.1 is also provided, which at least partially covers the electrical heating means 20. In particular, the first protective layer 14.1 may comprise a resist, preferably a photoresist.

On the second base side 11.2 of the first carrier element 11, the base unit 10 comprises a capacitive sensing means 30 for detecting an event 3. The sensing means 30 comprises a data line 35, which in particular is applied directly to the first carrier element 11. The data line 35 can be used for current supply and/or data communication of the sensing means 30. For this purpose, the data line 35 can preferably comprise a plurality of, in particular parallel, data conductors, through which, for example, a data bus can be provided. The data conductors can, for example, be provided as different and separate layers or run separately from each other in a plane. Furthermore, the sensing means 30 comprises two electrodes 31, between which an electric field can be generated. In particular, the two electrodes 31 can be partially connected to the data line 35. For electrical insulation, in particular of further regions, a further protective layer 14.3 can also be provided between the electrodes 31 and the data line 35. This can ensure that the electrodes 31 and the data line 35 contact each other only in some contact sections and that the electric field is therefore not or only slightly influenced by the data line 35. Furthermore, a second protective layer 14.2 is provided for the electrical insulation of the sensing means 30 from the environment, which at least partially covers the sensing means 30. Preferably, the sensing means 30 can be applied directly or indirectly to the second base side 11.2 of the first carrier element 11. In particular, the electrodes 31 and/or the data line 35 can be connected to the first carrier element 11 in a firmly-bonded connection by a printing method. The second protective layer 14.2 as well as the further protective layer 14.3 may in particular be varnished and/or applied by a printing method, preferably as photoresist.

Due to the described design of the base unit 10, it is flexible, so that the handling of the sensor mat 4 can differ from the handling of a rigid plate. This is particularly advantageous when handling on a construction site, as, for example, one person can carry the sensor mat 4, the sensor mat 4 can be delivered in a stack with further sensor mats 4 and/or the risk of breakage of the sensor mat 4 can be reduced. In particular, the base unit 10 forms a film-like, preferably moisture-impermeable composite. In order to further protect the base unit 10 from moisture, a sealing layer 60 is also arranged on the base unit 10, in particular indirectly on the second base side 11.2 of the first carrier element 11. For this purpose, an adhesive layer 70 is arranged between the base unit 10 and the sealing layer 60 to fix the sealing layer 60 to the base unit 10. Furthermore, the sealing layer 60 comprises a plurality of fibre layers 60.1, so that a tightness of the sealing layer 60 can be increased by the plurality of fibre layers 60.1. In particular, the sealing layer 60 may comprise a non-woven fabric. On the first base side 11.1 of the first carrier element 11, a sound insulation layer 50 is also fixed to the base unit 10. For this purpose, an adhesive layer 70 is also provided between the sound insulation layer 50 and the base unit 10 in order to ensure a firmly-bonded connection between the base unit 10 and the sound insulation layer 50. The sound insulation layer 50 comprises a positive effect on the sound transmission, in particular when using the sensor mat 4 as a floor heating system, so that impact sound is reduced. By forming the base unit 10 with the sensing means 30 in a layered compound, the base unit 10 can be laid flat for the design of a surface sensor system 1.2. By using the electrical heating means 20, the base unit 10 can be laid flat for the design of a surface heating system 1.1. In particular, this provides a double functionality of the sensor mat 4, so that when the sensor mat 4 is laid, the surface heating system 1.1 can be designed on the one hand and the surface sensor system 1.2 on the other hand. Thus, in particular, only one installation of the sensor mat 4 is necessary in order to realize a sensor functionality on the one hand and on the other hand a heating functionality within a room 101 of the building 100. In particular, the representation of FIG. 1 only schematically comprises a region of the sensor mat 4 in a sectional view, wherein the layer structure can, for example, depict a printing sequence during the production of the sensor mat 4. In particular, at least the sound insulation layer 50 and/or the sealing layer 60 and/or the protective layers 14.1, 14.2, 14.3 can extend over the full surface or partially of the full surface of the sensor mat 4.

Figure 2:
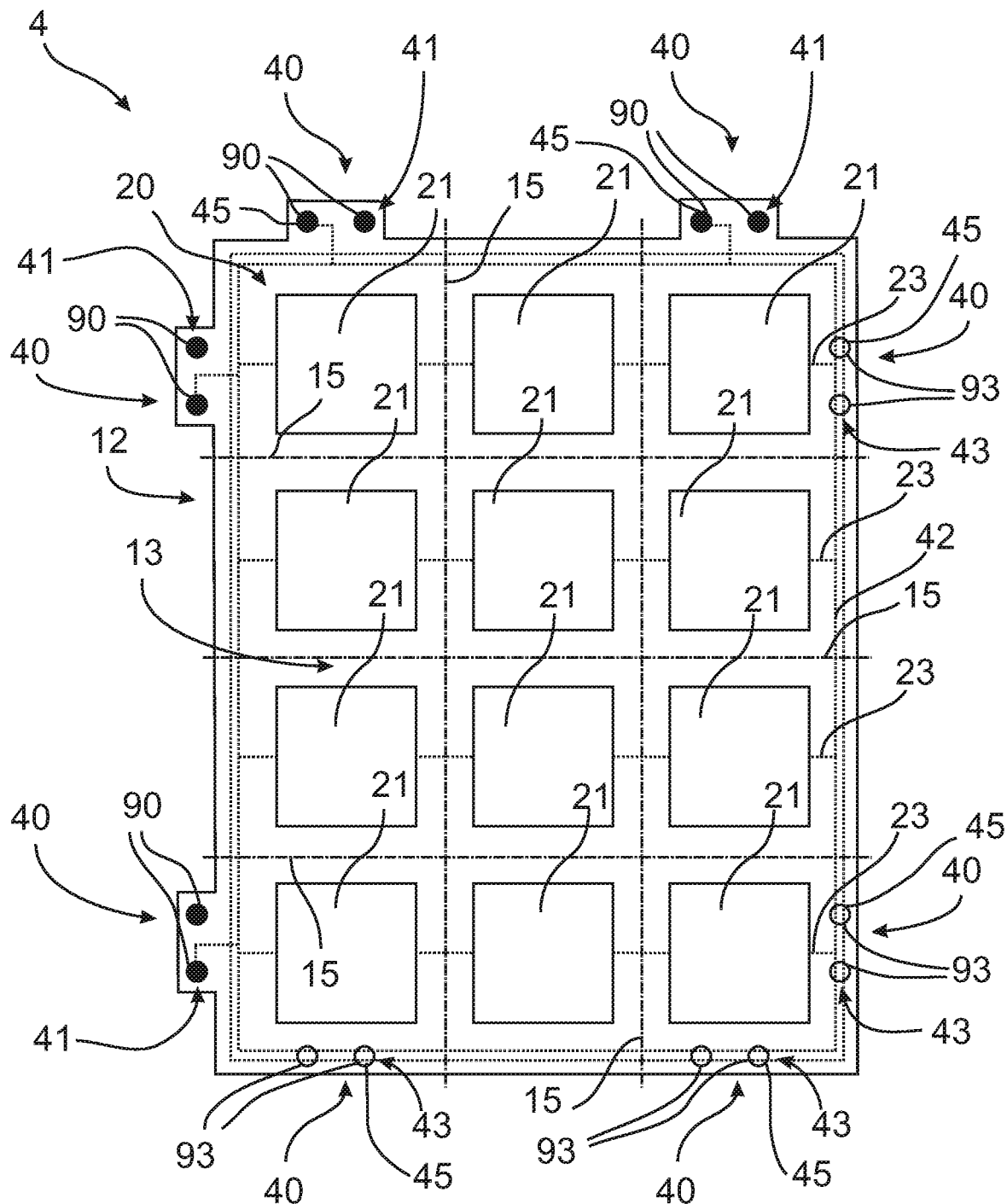
Figure 3:
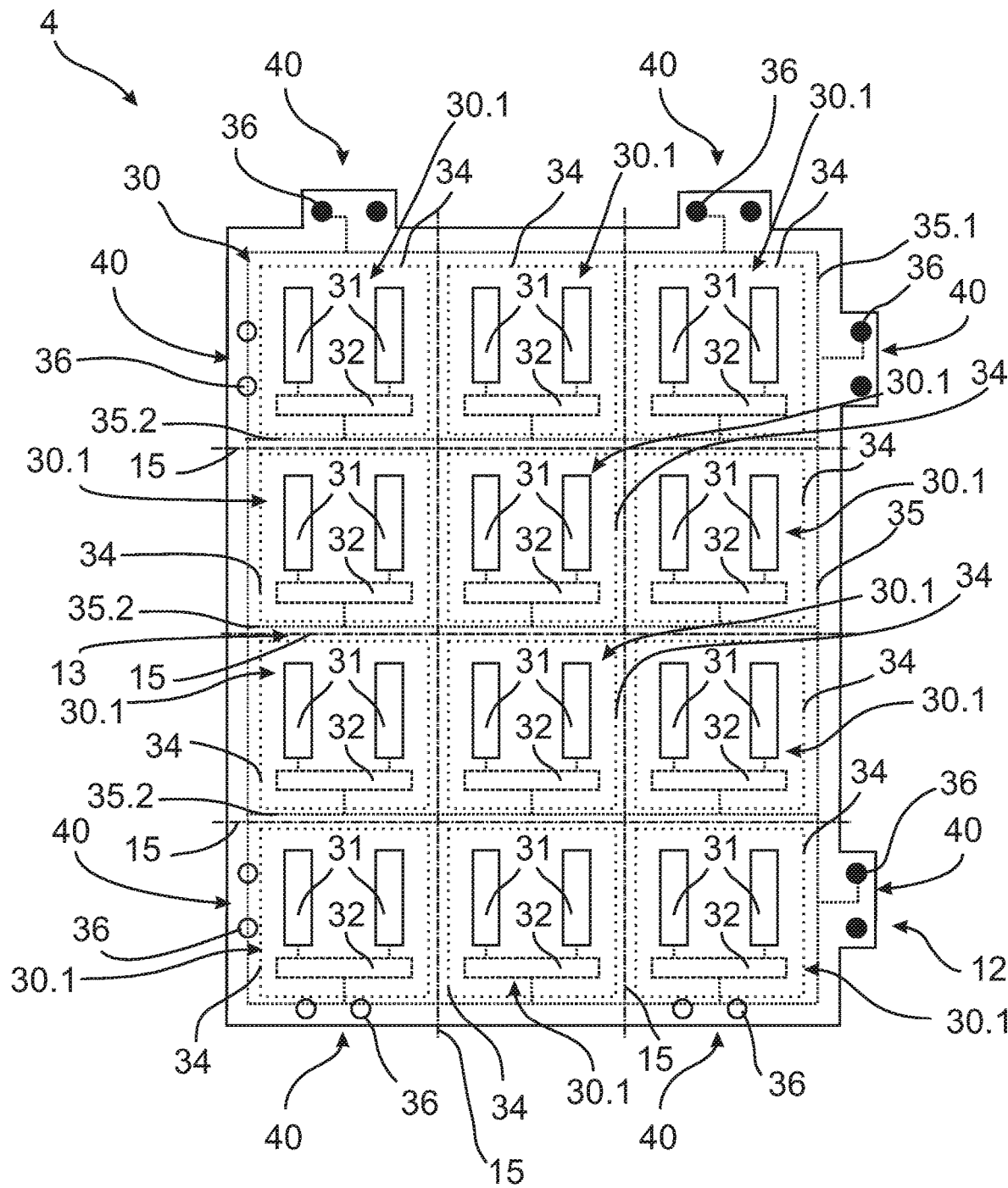

FIG. 2 shows a schematic plan view of the base unit 10 of the sensor mat 4 of the first embodiment on the first base side 11.1 of the first carrier element 11. It is shown that the sensor mat 4 comprises a plurality of flat, in particular plate-like, resistor elements 21 in a regular distribution pattern. The resistor elements 21 are connected via heating conductor elements 23 to at least one conductor track 42, preferably a plurality of conductor tracks 42, running in an edge region 12 of the base unit 10. Via the conductor track 42, the resistor elements 21 are thereby connected to heating connections 45, which may be part of electrical connections 40, which are arranged in the edge region 12 of the base unit 10. The resistor elements 21 are located in a central region 13 of the base unit 10. The conductor track 42 is further provided circumferentially in the edge region 12. This makes it easy to adapt the sensor mat 4 to a special geometry of a room, such as a bay window, by cutting off a sub-region of the base unit 10. Because a plurality of electrical connections 40 are provided and the conductor track 42 is formed circumferentially, at least part of the functionality of the electrical heating means 20 can thus be retained if individual resistor elements 21 and/or individual electrical connections 40 are cut off. For at least parts of the remaining resistor elements 21, preferably at least one electrical connection 40 and the corresponding contact via the conductor track 42 is retained. Thus, in particular nominal cutting lines 15 are provided, along which it is possible to cut the sensor mat 4 to adapt the geometry of the room 101. The nominal cutting lines 15 are pre-printed or pre-perforated and/or result from the arrangement of the resistor elements 21 and/or sensor elements 30.1, which are shown in FIG. 3. Preferably the sensor mat 4 is designed as a sensor module to be connected with further sensor modules for a surface heating system 1.1 and/or a surface sensor system 1.2. In order to provide a simple possibility of electrical coupling, the electrical connections 40 comprise connection interfaces 41 and/or counter-connection interfaces 43. In particular, the connection interfaces 41 can be connected with counter-connection interfaces 43 of further sensor mats. For this purpose, each connection interface can comprise at least one, preferably a plurality of, connection means 90 and each counter-connection interface can comprise one, preferably a plurality of, counter-connection means 93. Preferably, the connection interface 41 and/or the counter-connection interface 43 can be designed for reversible mechanical fixing. In particular, the connection means can thus be designed as a push-button and/or the counter-connection means 93 as an eyelet. In this way, an electrical coupling of the sensor mat 4 with an energy source 2 and/or a control unit 22 can be connected quickly and reliably. The connection means 90 and/or the counter-connection means 93 can preferably be glued to the base unit 10 by an electrically conductive adhesive.

In particular, a sensor element 30.1 is assigned to each resistor element 21 of the electrical heating element 20. This may also further simplify the cutting of the sensor mat 4, so that cutting to size separates the same number of sensor elements 30.1 as resistor elements 21. The sensing means 30 is shown schematically in a plan view of the second base side 11.2 of the first carrier element 11 in FIG. 3. The sensing means 30 comprises the sensor elements 30.1, which each comprise two electrodes 31 to generate an electric field. Each sensor element 30.1 is connected to a decentralized evaluation unit 32. The decentralized evaluation unit 32 is also arranged in the vicinity of the respective sensor elements 30.1, so that a connecting distance between the sensor elements 30.1 and the respective evaluation unit 32 can be kept small. In particular, the decentralized evaluation unit 32 is designed to convert analogue measuring signals of the sensor elements 30.1 into digital signals. Furthermore, the decentralized evaluation units 32 are connected with a data line 35. The data line 35 also comprises a supply section 35.2 and a ring section 35.1. In particular, the ring section 35.1 is arranged at least partially parallel to the conductor track 42, circumferentially in the edge region 12 of the base unit 10. The supply section 35.2 is in particular arranged parallel to the heating conductor element 23, at least partially in the central region 13 of the base unit 10. Thus, the evaluation units 32 can be connected to the ring section 35.1 via the supply section 35.2. Preferably, each supply section 35.2 can contact the ring section 35.1 a plurality of times. This also results in an advantageous cutting of the sensor mat 4, so that, for example, the functionality of remaining sensor elements 30.1 can be retained even if an upper region of the sensor mat 4 is cut off. The ring section 35.1 is also connected to a plurality of data connections 36, which can be part of the electrical connections 40 for the electrical heating means 20 or can form separate electrical connections 40. In particular, the data line 35 can comprise a plurality of data lines, which run in parallel, for example to be able to transmit different data and/or to provide a bus. Furthermore, the dashed representation shows sensing regions 34 of the sensing means 30 of the sensor mat 4, which can be monitored by the sensor elements 30.1.

Figure 4:
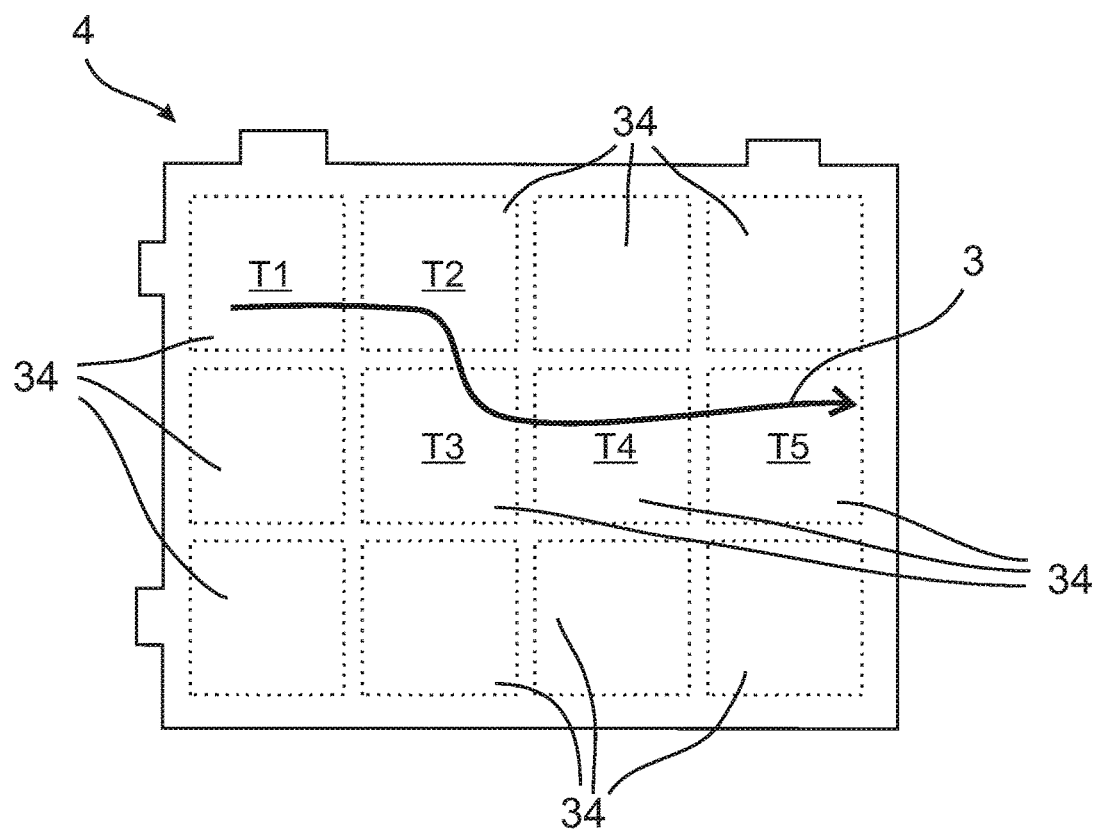

FIG. 4 schematically shows a plurality of sensing regions 34, each of which can be generated by the sensor elements 30.1. In order, for example, to be able to detect the behaviour of a person or the presence of a person as the event 3, it may be provided to monitor the sensing regions 34 individually and, in particular, to evaluate them at different points of time T1 to T5. Thus, for example, an event 3 can be tracked in the form of a movement of a person, so that the use of the surface sensor system 1.2 of the sensor mat 4 is particularly suitable for commercial applications in such a way that the behaviour of visitor flows can be analysed. In this way, it is possible to find out, for example, whether a product is particularly interesting for visitors or something similar.

Figure 5:
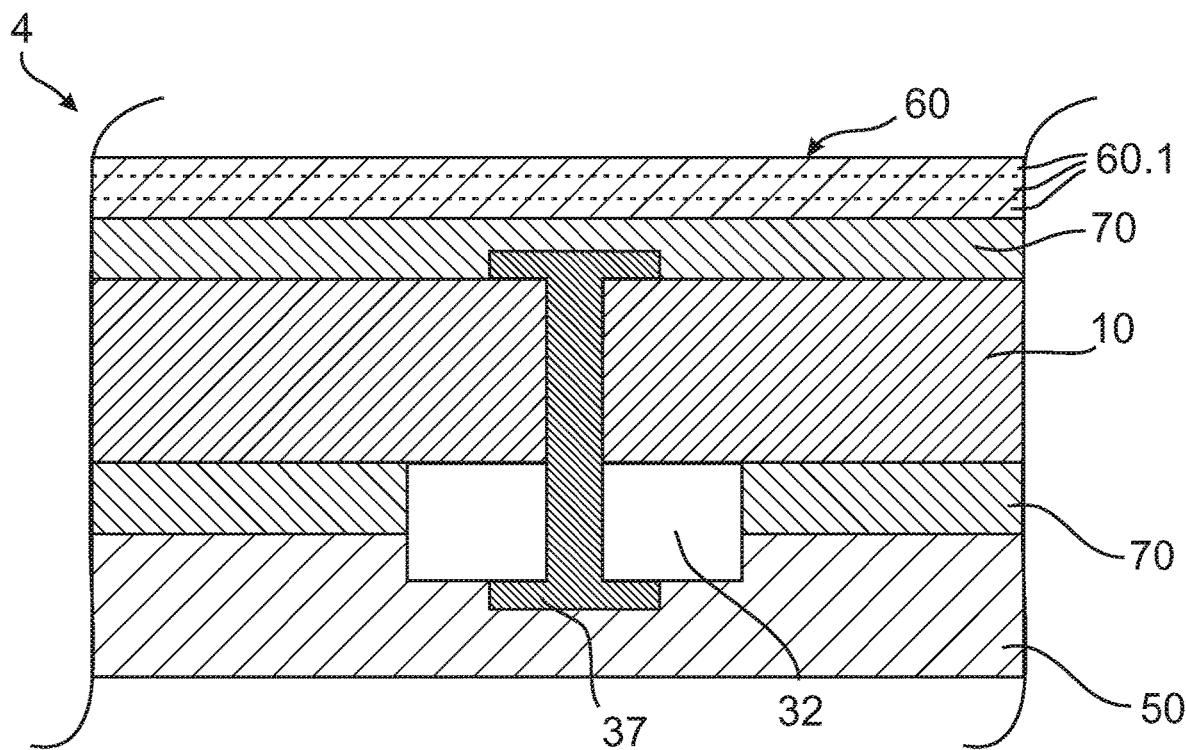

FIG. 5 also shows a possible connection of the decentralized evaluation unit 32 with the sensor elements 30.1 of the sensing means 30. In particular, the decentralized evaluation unit 32 can be provided on the first base side 11.1 of the first carrier element 11, on which the electrical heating means 20 is also arranged. A connection of the sensor elements 30.1 with the decentralized evaluation unit 32 through the first carrier element 11 can be ensured in a particularly simple form by a respective passage element 37, which can be designed in particular as a rivet. This can further facilitate the series production of the sensor mat 4. At the same time, the decentralized evaluation unit 32 can be fixed to the base unit 10. In particular, the evaluation unit 32 can also be advantageously embedded in the sound insulation layer 50, which can be designed to be particularly pliable and can thus provide elastic protection when the sensor mat 4 is stressed, for example by the movement of a person.

FIG. 6 further shows a schematic representation of an edge region 12 of the sensor mat 4 of the first embodiment. Here the base unit 10 is shown with one of the electrical connections 40. In addition, part of the adhesive layers 70 is arranged in the edge region. At least one of the adhesive layers 70 comprises a first adhesive region 71.1 as fixing interface 44 for connecting the sensor mat 4 with further sensor mats and/or further components of the surface heating system 1.1. Furthermore, a second adhesive region 71.2 is provided, through which the base unit 10 is connected to the sealing layer 60 and/or the sound insulation layer 50. Thus, a plurality of functions can be easily realized by the respective adhesive layer.

FIG. 7 shows the inventive sensor mat 4 of the first embodiment with a possible bending. The sensor mat 4 can be bent by a bending angle A. This is possible, in particular, because the base unit 10 is flexibly designed. Preferably, the achievable bending angle A can be greater than or equal to 10°, preferably greater than or equal to 45°, particularly preferably greater than or equal to 90°. The achievable bending angle can refer in particular to a horizontal, if the sensor mat 4 rests at least partially, e.g. on a floor. However, a bending radius R may also be provided, which illustrates that the bending angle A is to be distinguished from a kink. In particular, the decentralized evaluation units 32 can also be rigid, so that a bending between the decentralized evaluation units 32 is possible.

FIG. 8 also shows a connection of a plurality of sensor mats 4. The sensor mats 4 form the surface heating system 1.1 or the surface sensor system 1.2. The sensor mats 4 are connected to each other by electrical connections 40, through which an electrical coupling 40.1 can be established. The electrical coupling 40.1 can provide an energy supply and/or a data connection. One of the sensor mats 4 is preferably designed as a master element 4.1, which can be directly connected to the control unit 22 in a communication connection. In particular, the master element 4.1 can comprise a temperature sensor 24 for calibrating and/or adjusting the surface heating system 1.1. It is also shown that the sensor mats 4 overlap in their edge regions 12. In particular, the edge regions 12 can each comprise first adhesive regions 71.1, which can form a fixing interface 44. The fixing interfaces 44 allow the sensor mats 4.1, 4.2 to be fixed in particular to each other. The control unit 22, which is connected to the master element 4.1, can also comprise a central control apparatus 33, by which preferably a heating power of the sensor mats 4 and a detection of events 3 of the sensor mats 4 can be controlled or evaluated. Preferably, the central control apparatus 33 can be provided in a flush-mounted box of a room 101 of a building 100.

Figure 9:
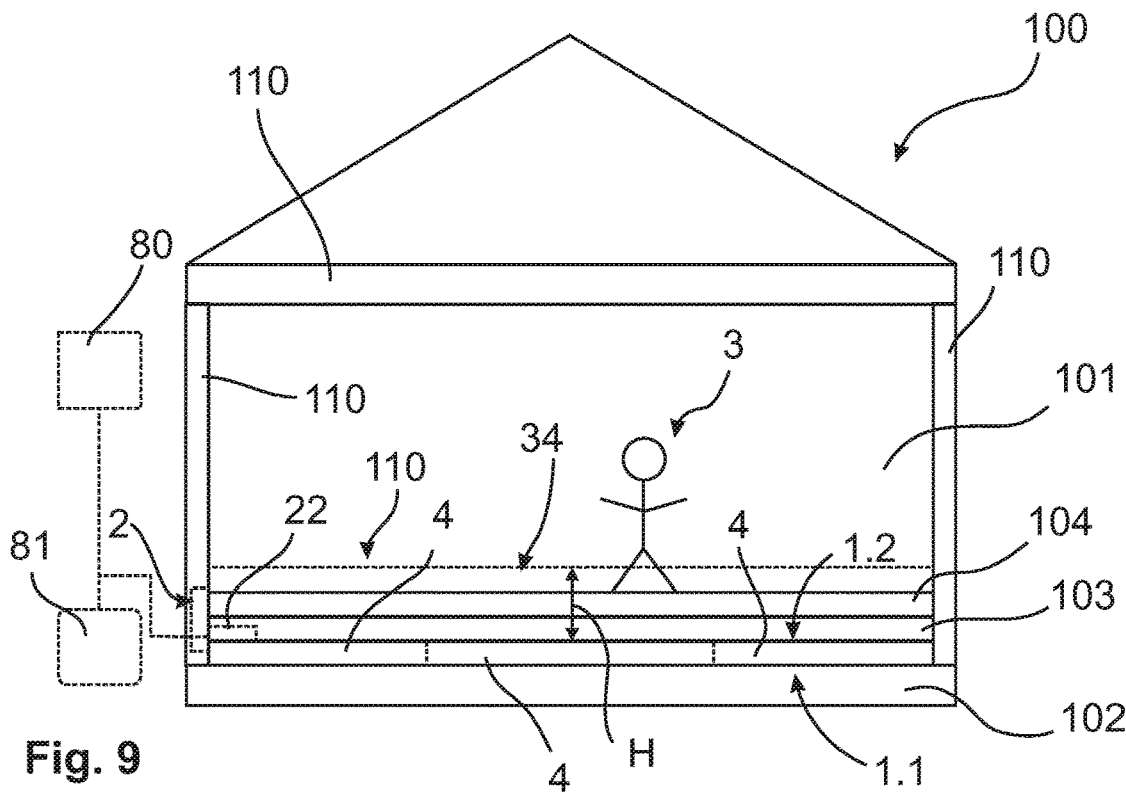

FIG. 9 further shows a building 100 with a room 101, which can be heated by a surface heating system 1.1 and can be monitored at least partially by a surface sensor system 1.2. The monitoring of the room 101 may comprise the detection of an event 3, wherein the event 3 may preferably comprise an activity of a person. In particular, the activity of a person can be a stay of the person. In particular, the surface sensor system 1.2 can further be designed for capacitive detection of the event 3. The surface heating system 1.1 and the surface sensor system 1.2 are thereby formed by the inventive sensor mat 4, preferably by a combination of a plurality of sensor mats 4 according to the first embodiment. For this purpose, the sensor mats 4 are arranged on a structural element 102 of a limiting element 110 of the room 101. The structural element 102 can preferably be a raw floor component. Furthermore, a functional cover 103, which can preferably be a screed, as well as a visual cover 104, which can for example comprise tiles and/or carpet and/or laminate and/or the like, are arranged on the sensor mats 4. The surface sensor system 1.2 and/or the surface heating system 1.1 can be connected and/or connectable to an external computing unit 80 and/or a mobile terminal 81. In this way, for example, remote control of the surface heating system 1.1 and/or remote monitoring of the surface sensor system 1.2 by a user can also be carried out outside the building 100 and/or in another room of the building 100. Preferably, sensing regions 34 may be provided for the detection of the event 3, which, starting from sensor elements 30.1 of the sensor mats 4, comprise a height H of greater than or equal to 10 mm, preferably greater than or equal to 25 mm, particularly preferably greater than or equal to 40 mm, in order to enable reliable detection of the event 3 outside the limiting element 110.

FIGS. 10 and 11a to 11i further show method steps 201 to 212 of a method 200 according to the invention for producing a sensor mat 4 in a further embodiment. Preferably, a sensor mat of the first embodiment can thus be produced. The method 200 comprises a provision 201 of a first carrier element 11, which comprises a flat extension with a first base side 11.1 and a second base side 11.2. The provision 201 of the first carrier element 11 can preferably comprise the production of a film. Furthermore, a pre-tempering 202 of the first carrier element 11 is provided in order to reduce shrinkage of the first carrier element 11 in successive method steps. The first carrier element 11 is preferably heated and/or cooled. Furthermore, the method 200 comprises a construction 203 of a flexible base unit 10. The construction 203 of the flexible base unit 10 comprises an application 204 of an electrical heating means 20 on the first base side 11.1 of the first carrier element 11. In particular, an application 201.1 of a conductor material 21.1, 21.2 of the electrical heating means 20 in at least partially liquid form on the first base side 11.1 of the first carrier element 11 can be provided. After the application of 204.1 of the conductor material 21.1, 21.2, curing 204.2 of the conductor material 21.1, 21.2 may also be provided. The curing 204.2 can preferably be accelerated by UV radiation and/or heat radiation. Thus, the application 204 of the electrical heating means 20 may comprise in particular a printing of the electrical heating means 20 on the first carrier element 11 and/or further components of the base unit 10. Furthermore, the construction 203 of the base unit 10 comprises an application 205 of a sensing means 30 for detecting an event 3 on the first base side 11.2 of the first carrier element 11, so that at least the base unit 10 can be laid flat for the design of a surface sensor system 1.2. The application 205 of the sensing means 30 can preferably be carried out analogously to the application 204 of the electrical heating means 20, wherein an application 205 of a sensor material 31.1 of the sensing means 30 is carried out in at least partially liquid form on the second base side 11.2 of the first carrier element 11 and a curing 205.2 of the sensor material 31.1 is carried out. Thus, the sensing means 30 can also be printed, in particular on the first carrier element 11. Furthermore, the construction 203 of the base unit 10 comprises an application 206 of a first protective layer 14.1 to the electrical heating means 20, in particular by varnishing, and an application 207 of a second protective layer 14.2 to the sensing means 30, in particular also by varnishing. In this way, the sensing means 30 and/or the electrical heating means 20 can be at least partially electrically insulated and/or protected from environmental conditions. In particular subsequently, the construction 208 of a connection interface 41 and/or a counter-connection interface 43 by pressing on a connection means 90 and/or a counter-connection means 93 is provided. In particular, the connection interface 41 and/or the counter-connection interface 43 may be designed to produce a reversible mechanical connection of the sensor mat 4. Thus, the counter-connection means 93 can, for example, comprise an eyelet and the connection means 90 can preferably comprise a push-button, which can be connected to an eyelet. Thus, a plurality of sensor mats 4 can be connected together. Advantageously, the method 200 further comprises an application 209 of an adhesive layer 70 to a sealing layer 60 and/or to a sound insulation layer 50 and/or to the base unit 10. This is followed by fixing 210 the sealing layer 60 and/or the sound insulation layer 70 to the base unit 10 by the adhesive layer 70. In order to achieve an advantageous mechanical connection of the sensor mat 4 with further structural elements, the adhesive layer 70 can furthermore comprise an adhesive tape 71, which can be divided into at least two separately usable adhesive regions 71.1, 71.2 by scribing 211. Furthermore, the method 200 may comprise cutting 212 at least the first carrier element 11. It is conceivable that the composite of the base unit 10, the sealing layer 60 and the sound insulation layer 50 is cut to size together to define the external shape, so that a standard size and/or a shape of the sensor mat 4 is obtained, which is adapted to the room 101. Alternatively, the cutting 212 can be carried out beforehand in the method 200, in particular before applying 207 the second protective layer 14.2 to the sensing means 30. In this way, the shape for the further method steps 208-211 can already be predetermined, so that, for example, dimensions from these method steps 208-211 can be oriented on the form. This results in a simple production method for the sensor mat 4, in particular wherein the production method for the sensor mat 4 can be carried out centrally at a production location separate from the construction site, in particular in series and/or partially automated.

Figure 12:
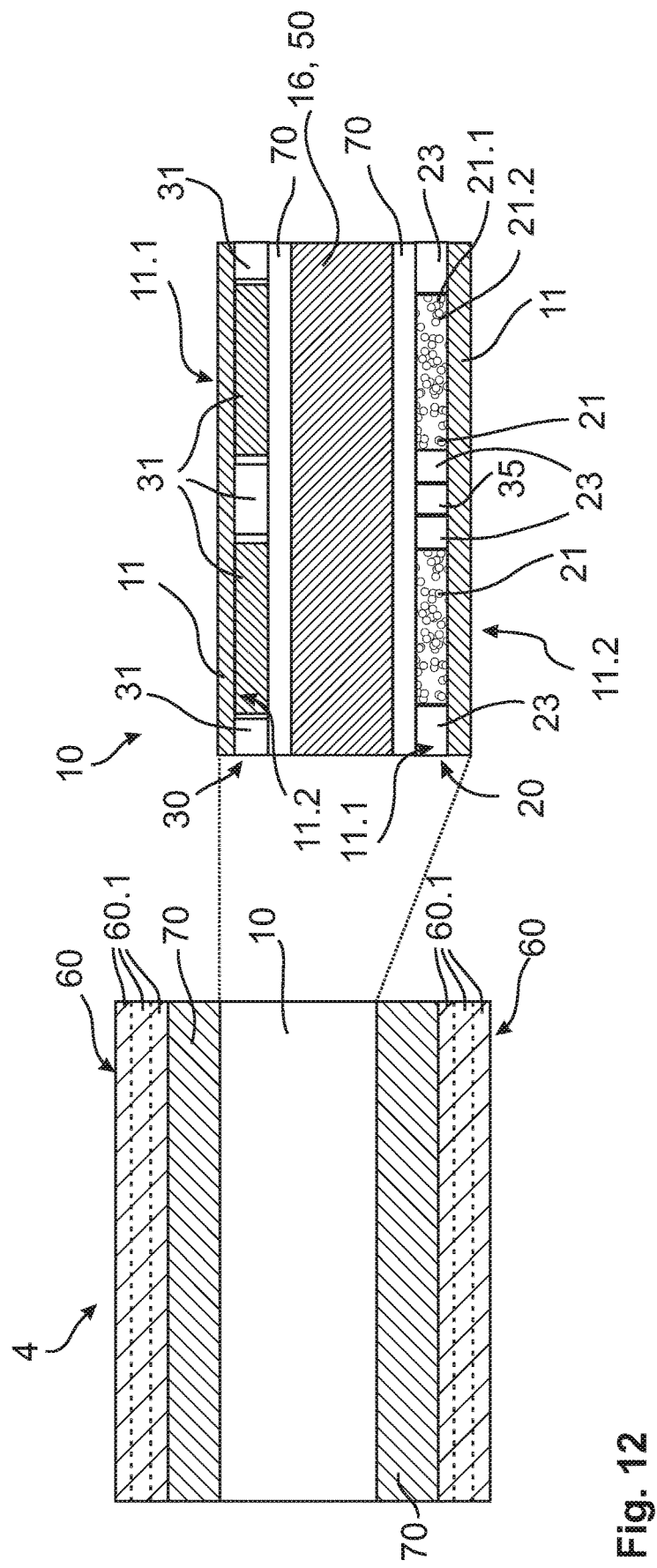

FIG. 12 shows a schematic design of a sensor mat 4 according to the invention with a detailed view of a base unit 10 of the sensor mat 4. The base unit 10 forms in particular a core of the sensor mat 4 with a square base area. The base unit 10 comprises a first and a second carrier element 11, which each comprise a flat extension with a first and a second base side 11.1, 11.2. Preferably at least one sealing layer 60 is arranged on the base unit 10, in particular fixed by an adhesive layer 70. The sealing layer 60 can be arranged with the adhesive layer 70 on the first and/or second carrier element 11. In addition or alternatively, a sound insulation layer 50, as shown in the first embodiment, can be arranged on the base unit 10. Thus, the first and second carrier element 11 are suitable for laying the sensor mat 4, for example as part of a limiting element 110 of the room 101, in particular a floor, of a building 100. Reference is made in particular to the illustration in FIG. 9. The first base side 11.1 of the second carrier element 11 preferably forms an upper side of the second carrier element 11 when the sensor mat 4 is installed as a floor heating system in the building 100. In this case, the second base side 11.2 of the second carrier element 11 correspondingly forms the lower side of the second carrier element 11 and/or the base unit 10. On the first base side 11.1 of the second carrier element 11, an electrical heating means 20 is provided for the emission of heat. The first base side 11.1 of the first carrier element 11 preferably forms an upper side of the first carrier element 11 and/or the base unit 10 if the sensor mat 4 is installed in the building 100 as a floor heating system. In this case, the second base side 11.2 preferably forms the lower side of the first carrier element 11. Thus, the second base side 11.1 of the first carrier element 11 and the first base side 11.2 of the second carrier element 11 face each other. On the second base side 11.2 of the first carrier element 11 a sensing means 30 is provided for the detection of an event 3. The heating means 20 and the sensing means 30 are thus arranged between the first and second carrier element 11 and are thus at least partially protected. Furthermore, an intermediate element 16 is arranged between the first and second carrier element 11, which is preferably designed as a sound insulation layer 50. Thus, a spatial distance and/or electrical insulation between the first and second carrier element 11 is ensured by the intermediate element 16. At the same time, impact sound can be reduced by the intermediate element 16.

Figure 13:
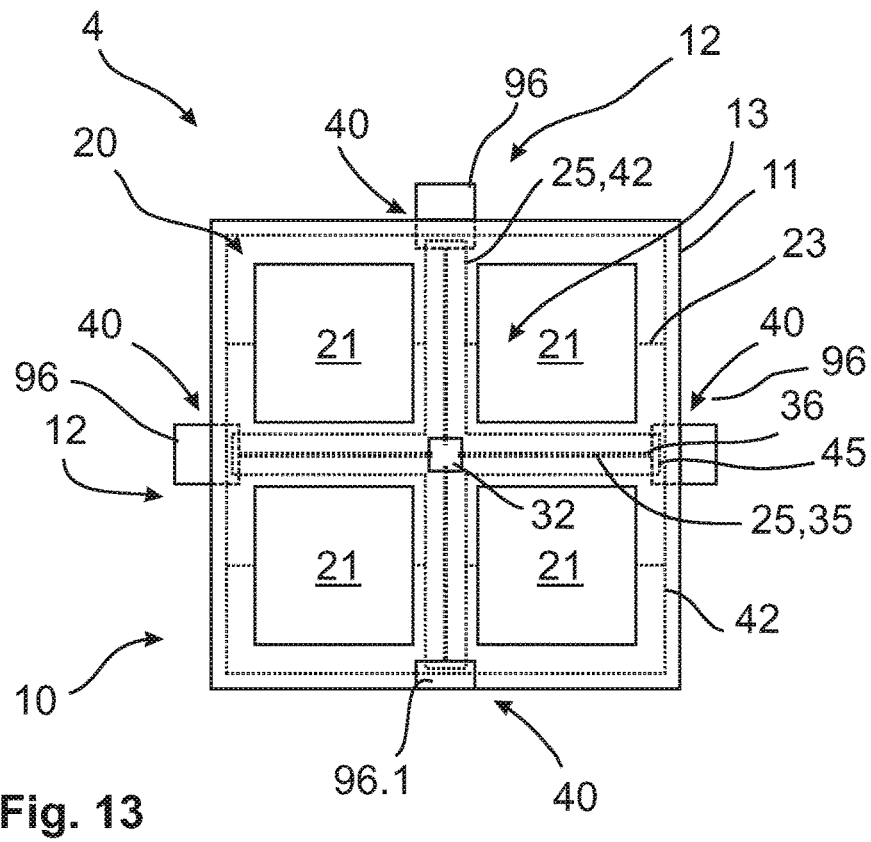

FIG. 13 shows a plan view of the second carrier element 11 of the base unit 10 with the electrical heating means 20. The electrical heating means 20 comprises at least one resistor element 21 which extends on the first base side 11.1 of the second carrier element 11 and is designed preferably flat, in particular plate-like. Furthermore, the electrical heating means 20 comprises at least two conductor tracks 42, through which the resistor element 21 is connected to an electrical connection 40 of the sensor mat 4. The conductor tracks 42 and/or the resistor element 21 can be printed on the second carrier element 11. Preferably, the conductor tracks 42 are first printed directly on the second carrier element 11 and the resistor element 21 is printed at least partially on heating conductor elements 23 connected to the conductor tracks 42 and/or at least partially on the second carrier element 11. In particular, the conductor tracks 42, the heating conductor elements 23 and the resistor element 21 are in a firmly-bonded connection to the second carrier element 11 and/or to one another. In order to keep the electrical resistance of the heating conductor elements 23 and the conductor tracks 42 low, the heating conductor elements 23 and the conductor tracks 42 comprise in particular a noble metal, preferably silver. The resistor element 21 is designed to emit heat when it is energized. The emitted heat results in particular from the resistance of the resistor element 21. In particular the resistor element 21 comprises a carbon paste comprising carbon 21.1 and/or a filler 21.2. For the electrical insulation of the heating means 20, a first protective layer 14.1 can also be provided, as in the first embodiment, which covers the electrical heating means 20 at least partially. In particular, the heating means 20 comprises a plurality of resistor elements 21 in a regular pattern. One of the conductor tracks 42 is designed as a cross-like circumferential connection section 25. This means that electrical connections 40, which are arranged in an edge region 12 of the base unit 10, can still be used to supply energy to one of the resistor elements 21 even if the sensor mat 4 is cut to size to adapt to a geometry of the room 101. One of the conductor tracks 42 also comprises a circumferential section in an edge region 12 of the base unit 10, which improves the ability to cut the sensor mat 4 to size.

Figure 14:
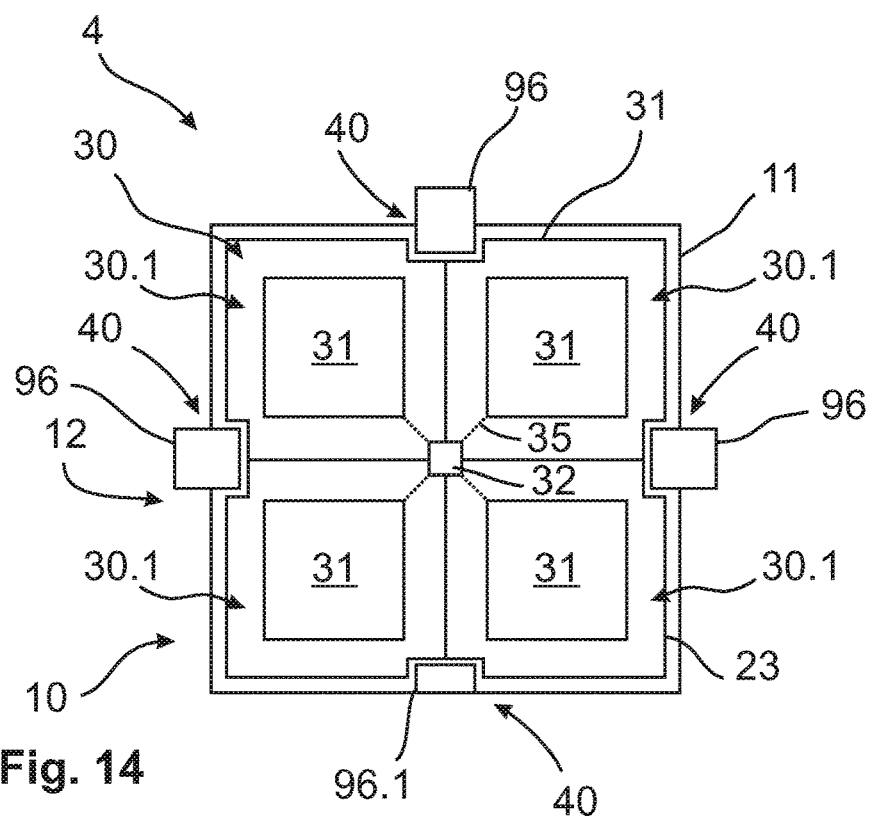

The sensing means 30 can preferably be designed for capacitive detection of the event 3. The base unit 10 comprises at least one data line 35, which in particular is applied directly to the first and/or second carrier element 11. As shown in FIG. 13, the data line 35 comprises connection sections 25, which extend cross-like from a decentralized evaluation unit 32 arranged centrally on the base unit 10 to the electrical connections 40. The data line 35 can be used for the current supply and/or data communication of the sensing means 30. For this purpose, the data line 35 can preferably comprise a plurality of data conductors, in particular running in parallel, through which, for example, a data BUS can be provided. FIG. 14 shows a plan view of the first carrier element 11 of the base unit 10 with the sensing means 30. Furthermore, the sensing means 30 comprises two electrodes 31, through which an electric field can be generated. One of the electrodes 31 is designed as a shield electrode for limiting the electric field and is circumferential in the edge region 12 of the base unit 10. Furthermore, a second protective layer 14.2, as shown in the embodiment in FIG. 1, can be provided to electrically insulate the sensing means 30 from the environment, wherein the second protective layer 14.2 preferably covers the sensing means 30 at least partially. In particular, the sensing means 30 is applied directly or indirectly to the second base side 11.2 of the first carrier element 11. Furthermore, the electrodes 31 and/or the data line 35 can be in a firmly-bonded connection to the first carrier element 11 by a printing method. The sensing means 30 comprises four sensor elements 30.1 for the detection of the event 3, each of which is formed by an electrode 31 and the surrounding electrode 31 in the form of the shield electrode. This creates four sensing regions 34 in particular for the detection of the event 3.

Figure 15:
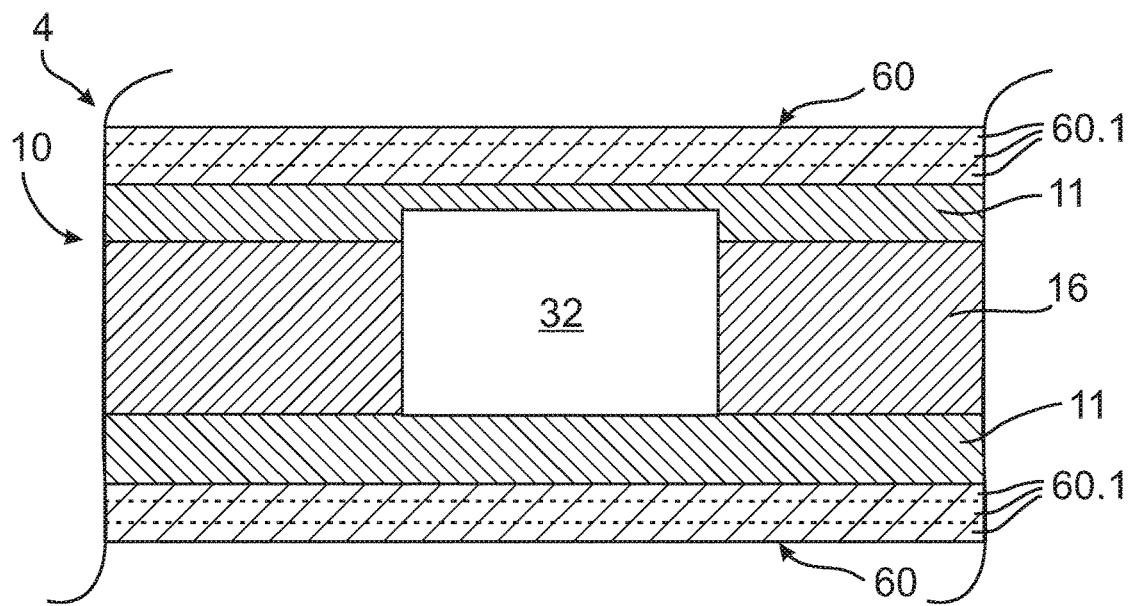

The decentralized evaluation unit 32 is connected to each of the sensor elements 30.1 of the sensor mat 4. The decentralized evaluation unit 32 is also located near the respective sensor elements 30.1 due to its central arrangement, so that a connecting distance between the sensor elements 30.1 and the respective evaluation unit 32 can be kept small. In particular, the decentralized evaluation unit 32 is designed to convert analogue measuring signals of the sensor elements 30.1 into digital signals. Furthermore, a pre-evaluation of the measuring signals can be carried out by the decentralized evaluation unit 32. FIG. 15 also shows the arrangement of the decentralized evaluation unit 32 in the base unit 10 in a sectional view. The decentralized evaluation unit 32 extends at least partially into a receiving opening of the intermediate element 16. This means that the decentralized evaluation unit 32 also enables an electrical coupling between components of the first and second carrier element 11. In particular, this means that the connection sections 25 of the data line 35 can be connected to the sensing means 30 via the decentralized evaluation unit 32.

Figure 16A:
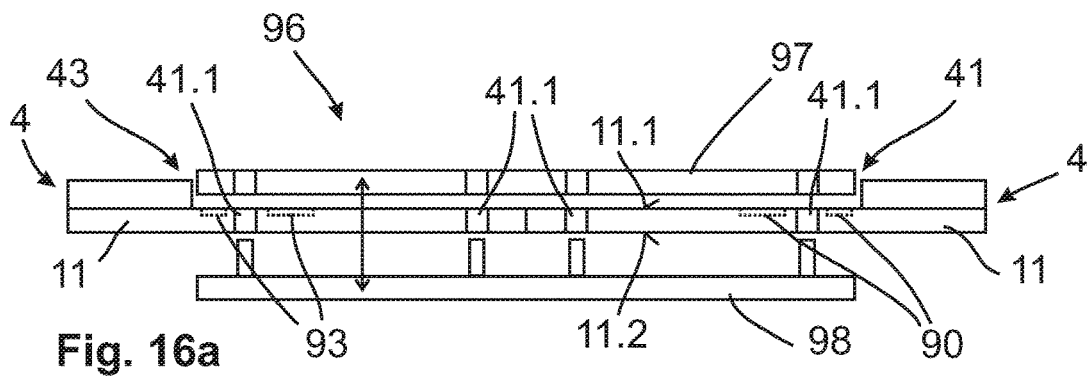
Figure 16B:
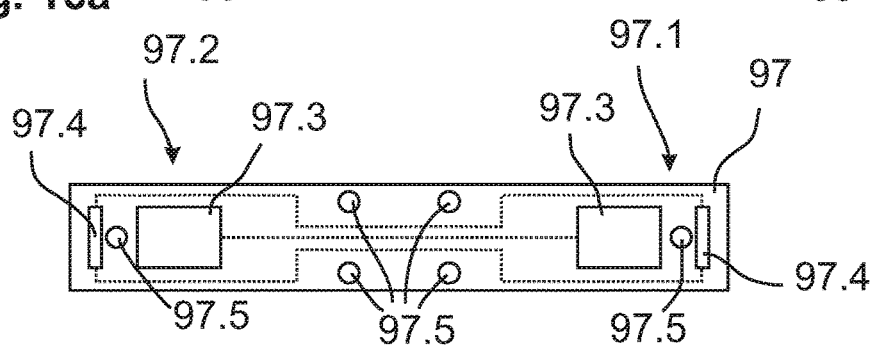
Figure 16C:
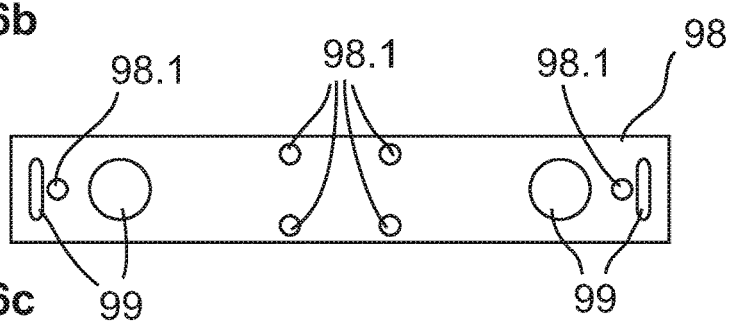

As shown in FIG. 16a, the electrical connections 40 each comprise a connection interface 41 for connecting the electrical heating means 20 and the sensing means 30 to a connection unit 96. The connection unit 96 ensures an electrical coupling between the connection interface 41 and a counter-connection interface 43, so that the electrical connection 40 allows the sensor mat 4 to be connected at least indirectly to an energy source 2 and/or a control unit 22. In particular, the sensor mat 4 can be connected to a further sensor mat 4 and/or a network of further sensor mats 4 for connection to the energy source 2 and/or the control unit 22. Accordingly, the counter-connection interface 43 can be part of the further sensor mat 4. Unused electrical connections 40 can preferably be closed by a dummy piece 96.1. The connection unit 96 also comprises a flat connection body 97, as shown in FIG. 16b, and a flat fixing body 98, as shown in FIG. 16c. For the electrical coupling of the connection interface 41 and the counter-connection interface 43, the connection body 97 can be arranged in a recess 46 of the base unit 10 of the sensor mat 4. In this case the connection body 97 comprises a first and a second contact section 97.1, 97.2 which are electrically coupled to each other. In order to ensure separate contacting of the sensing means 30 and the heating means 20, the first and second contact sections 97.1, 97.2 each comprise at least one first contact element 97.3 and one second contact element 97.4, wherein the first contact elements 97.3 and second contact elements 97.4 each are separately connected to one another. The connection interface 41 further comprises two connection means 90 in the form of electrical contacts on the first base side 11.1 of the second carrier element 11. The counter-connection interface 43 comprises two analogously designed counter-connection means 93 in the form of electrical contacts. Thus, two similar interfaces 41, 43 can be easily connected legitimate to the construction site by the connection unit 96. To simplify the fixing of the connection unit 96, a fixing body 98 is further provided. It can be arranged on a side of the second carrier element 11 opposite the connection body 97. Furthermore, the fixing body 98 comprises magnets 99 which can be brought into operative connection with the contact elements 97.3. In particular, the contact elements 97.3 can be magnetised for this purpose. If the fixing body 98 and the connection body 97 are thus arranged in such a way that the second carrier element 11 is arranged between the fixing body 98 and the connection body 97, the second carrier element 11 is clamped by the connection unit 96. At the same time, the magnets 99 cause a magnetic force on the contact elements 97.3, so that the contact elements 97.3 are pressed against the connection means 90 or the counter-connection means 93. On the one hand, this results in a force-locking fixation of the connection unit 96 to the sensor mat 4 and on the other hand in a reliable contacting. For a form-fitting connection and correct positioning of the connection unit 96, the fixing body 98 also comprises at least one positioning aid 98.1 in the form of projections, the connection body 97 comprises at least one counter-positioning aid 97.5 and the connection interface 41 comprises at least one alignment means 41.1. When fixing the connection unit 96 to the connection interface, the positioning aid 98.1 acts together with the counter-positioning aid 97.5 and the alignment means 41.1 so that a form-fitting connection is produced. In addition, the clever arrangement and design of the positioning aid 98.2, the counter-positioning aid 97.5 and the alignment means 41.1 prevents incorrect positioning of the connection unit 96.

Figure 17:
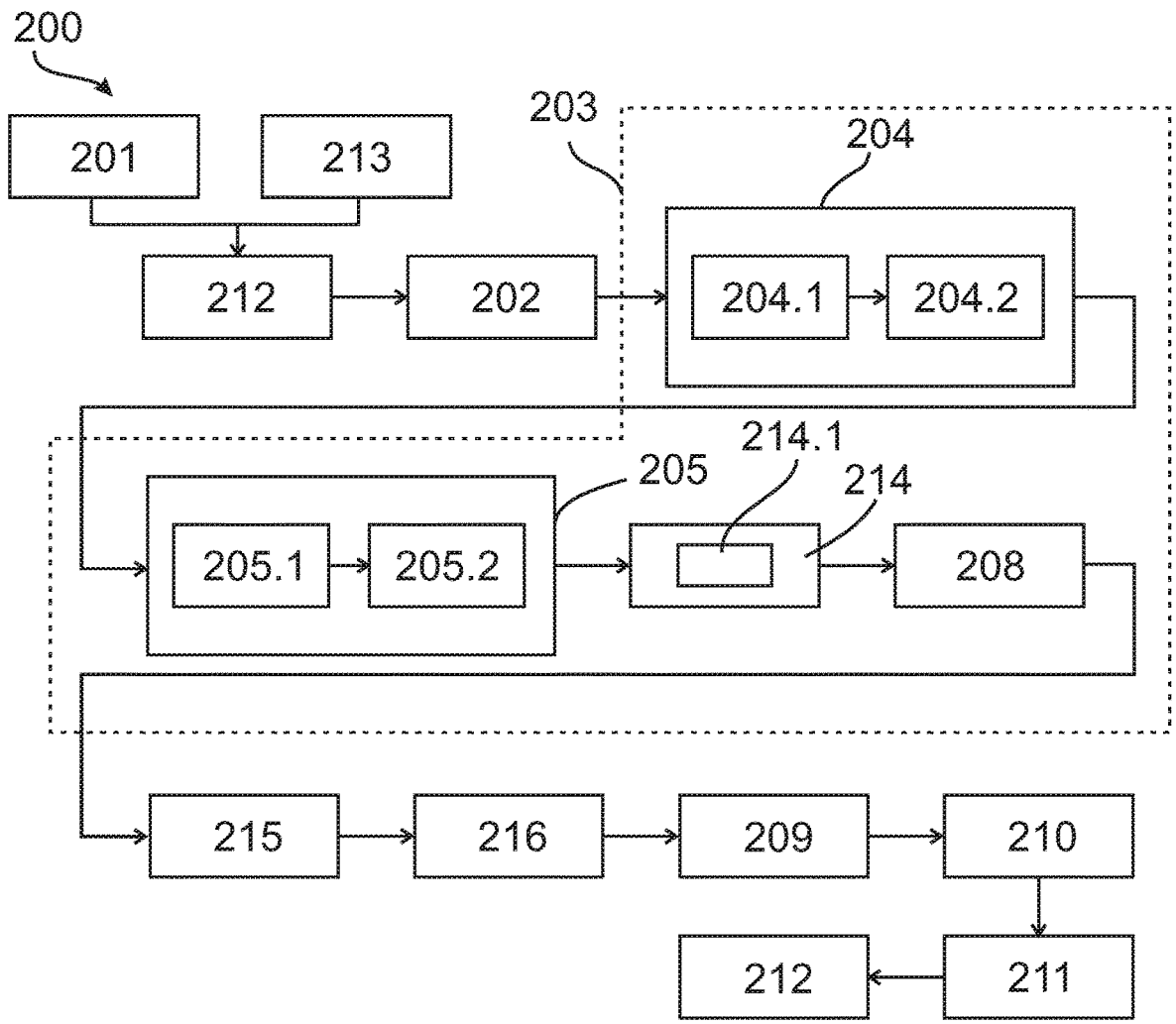
Figure 18A:
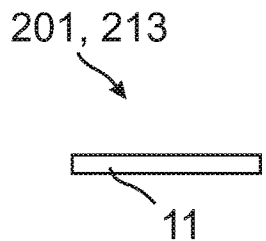
Figure 18B:
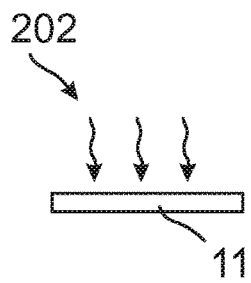
Figure 18C:
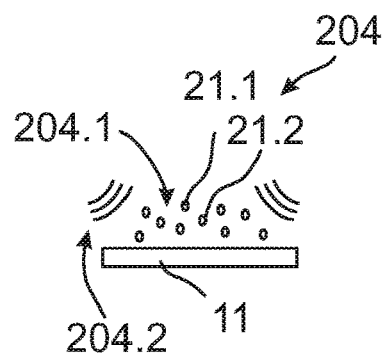
Figure 18D:
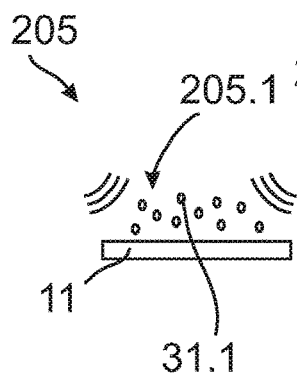
Figure 18E:
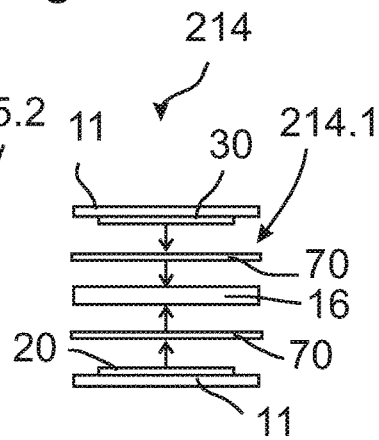
Figure 18F:
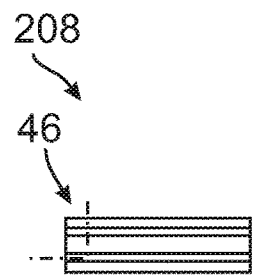
Figure 18G:
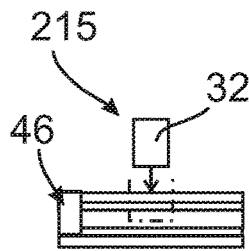
Figure 18H:
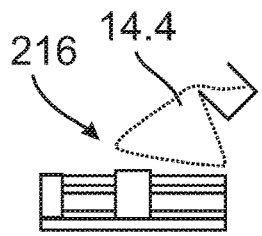
Figure 18I:
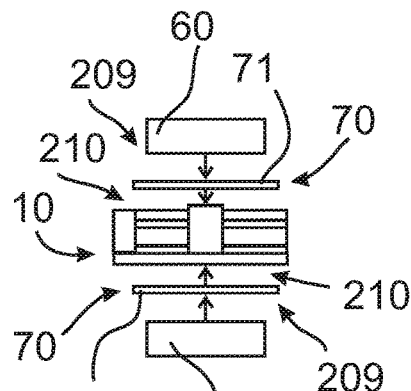
Figure 18J:
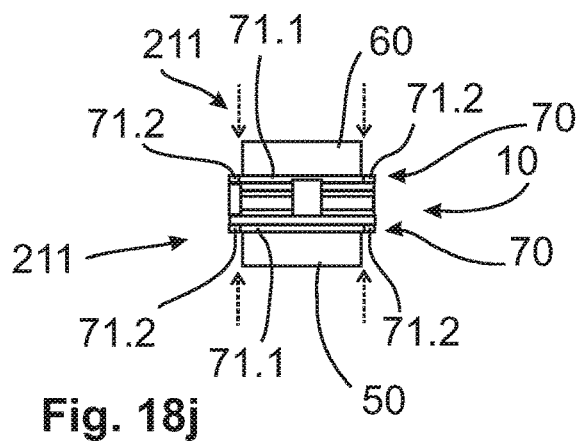
Figure 18K:
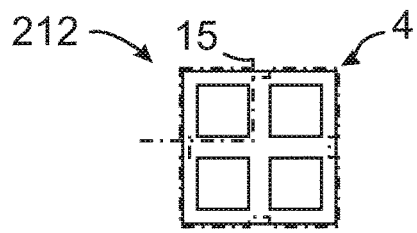

FIGS. 17 and 18a to 11k further show method steps of a method 200 according to the invention for producing a sensor mat 4 in a further embodiment. Preferably, a sensor mat of the embodiment shown in FIGS. 12 to 16 can be produced by this method. The method 200 comprises a provision 201 of a first carrier element 11 and a provision 213 of a second carrier element 11, each of which comprises a flat extension with a first base side 11.1 and a second base side 11.2. The provision 201, 213 of the carrier elements 11 can preferably each comprise the production of a film. Preferably, cutting to size 212 can be done after the first and second carrier elements 11 have been provided. In this way, the shape for the further method steps can already be predetermined, so that, for example, dimensions from these method steps can be oriented on the form. This results in a simple production method for the sensor mat 4, in particular wherein the production method for the sensor mat 4 can be carried out centrally at a production location separate from the construction site, in particular in series and/or partially automated. Furthermore, a pre-tempering 202 of the first and second carrier element 11 is provided in order to reduce shrinkage of the carrier elements 11 in successive method steps. The carrier elements 11 are preferably heated and/or cooled.

Figure 10:
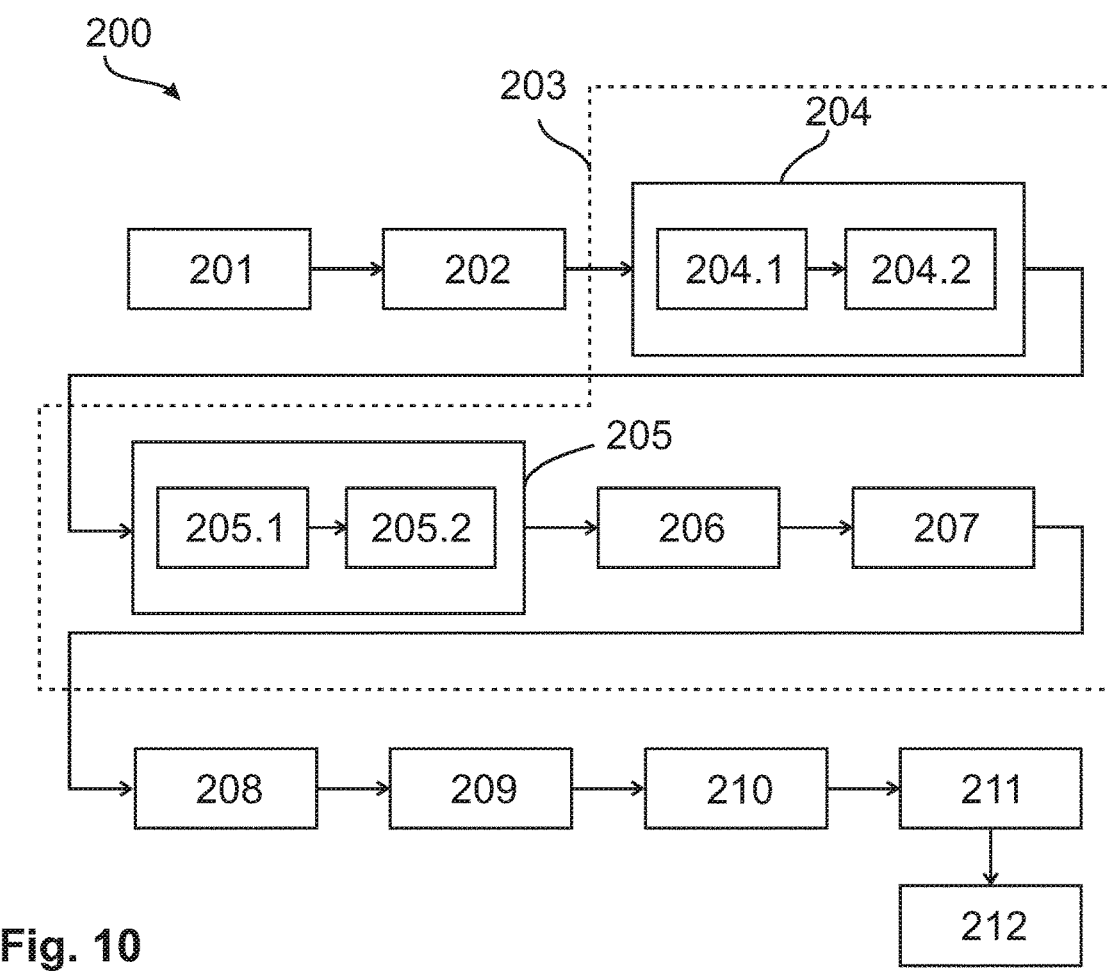
Figure 11A:
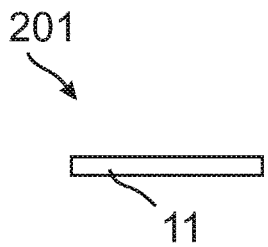
Figure 11B:
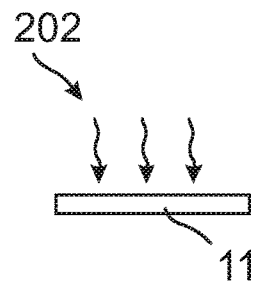
Figure 11C:
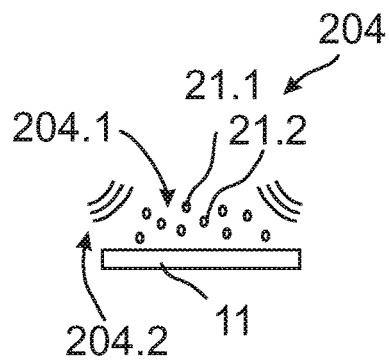
Figure 11D:
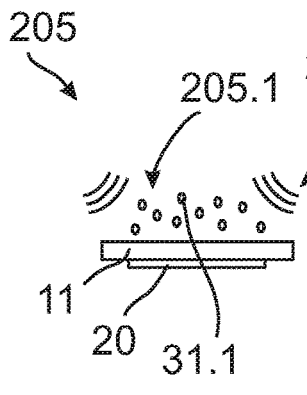
Figure 11E:
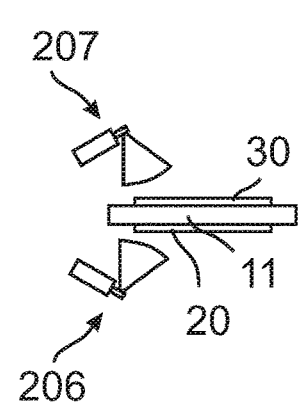
Figure 11F:
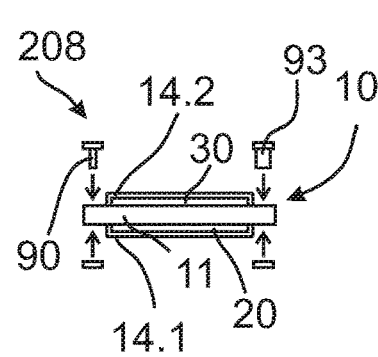
Figure 11G:
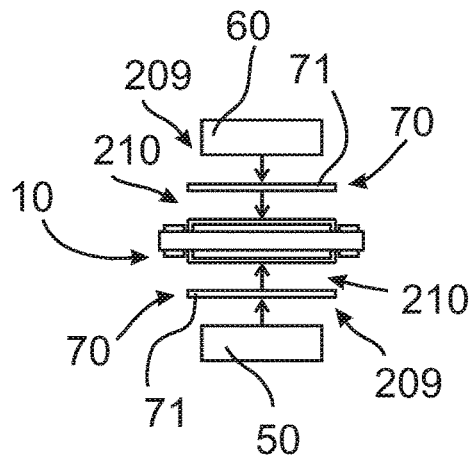
Figure 11H:
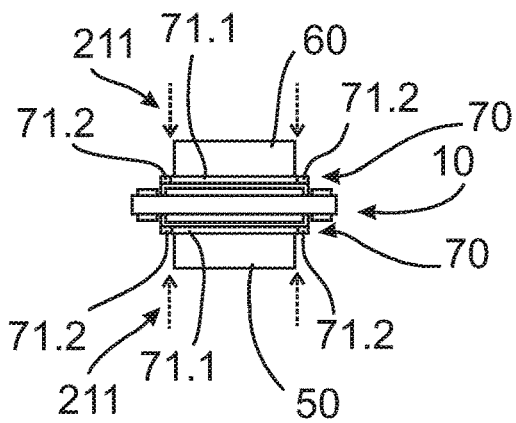
Figure 11I:
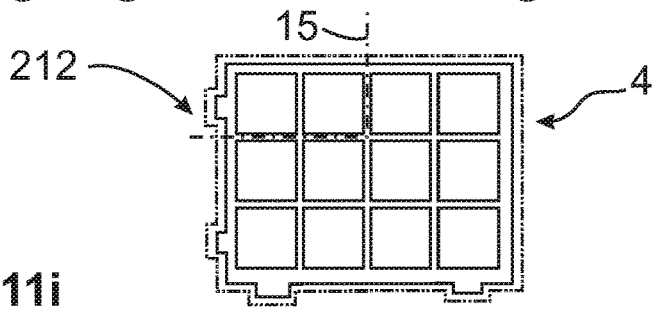

Furthermore, the method 200 comprises a construction 203 of a flexible base unit 10. The construction 203 of the flexible base unit 10 comprises an application 204 of an electrical heating means 20 on the first base side 11.1 of the second carrier element 11. In particular, an application 204.1 of a conductor material 21.1, 21.2 of the electrical heating means 20 in at least partially liquid form on the first base side 11.1 of the second carrier element 11 can be provided. After the application 204.1 of the conductor material 21.1, 21.2, a curing 204.2 of the conductor material 21.1, 21.2 can also be provided. The curing 204.2 can preferably be accelerated by UV radiation and/or heat radiation. Thus, the application 204 of the electrical heating means 20 may comprise in particular a printing of the electrical heating means 20 on the second carrier element 11 and/or further components of the base unit 10. Furthermore, the construction 203 of the base unit 10 comprises an application 205 of a sensing means 30 for detecting an event 3 on the second base side 11.2 of the first carrier element 11, so that at least the base unit 10 can be laid flat for the design of a surface sensor system 1.2. The application 205 of the sensing means 30 can preferably be carried out analogously to the application 204 of the electrical heating means 20, wherein an application 205.1 of a sensor material 31.1 of the sensing means 30 is carried out in at least partially liquid form on the second base side 11.2 of the first carrier element 11 and a curing 205.2 of the sensor material 31.1 is carried out. Thus, the sensing means 30 can be printed in particular on the first carrier element 11. Furthermore, the construction 203 of the base unit 10 may comprise an application 206 of a first protective layer 14.1 to the electrical heating means 20 and an application 207 of a second protective layer 14.2 to the sensing means 30, as shown in FIGS. 10 and 11e, in order to ensure, at least partially, an electrical insulation and/or protection against environmental conditions. In addition, the first and second carrier elements 11 are fixed 214 to one another by arranging 214.1 an intermediate element 16 between the first and second carrier elements 11 and the intermediate element 16 is fixed to the carrier elements 11 in each case by an adhesive layer 70, which can preferably be in the form of a double-sided adhesive tape 71. Furthermore, the method 200 comprises the construction 208 of a connection interface 41 by cutting a recess 46, into which a connection unit 96 can be inserted, into the base unit 10. Thereby, the recess 46 is at least partially limited by the second carrier element 11, as shown, for example, in FIG. 16a. In particular, the connection interface 41 may be designed to create a reversible mechanical connection between the sensor mat 4 and the connection unit 96.

Furthermore, the method 200 comprises an arrangement 215 of at least one decentralized evaluation unit 32 on the base unit 10 for processing sensor data of the sensing means 30. For this purpose, the decentralized evaluation unit 32 is electrically and mechanically connected to a data line 35 of the base unit 10 by means of an electrically conductive adhesive. It is advantageous that casting 216 of a casting compound 14.4 can then be carried out at least partially via the base unit 10 and/or the decentralized evaluation unit 32 in order to electrically insulate any open contacts that may still be present. Preferably, the method 200 further comprises applying 209 an adhesive layer 70 to a sealing layer 60 and/or to a sound insulation layer 50 and/or to the base unit 10. It is followed by fixing 210 the sealing layer 60 and/or the sound insulation layer 70 to the base unit 10 by the adhesive layer 70. In order to achieve an advantageous mechanical connection of the sensor mat 4 with further structural elements, the adhesive layer 70 can furthermore comprise an adhesive tape 71, which can be divided by scribing 211 to at least two separately usable adhesive regions 71.1, 71.2. Furthermore, the method 200 may comprise cutting 212 at least the first and/or second carrier element 11. It is conceivable that the composite of the base unit 10, the sealing layer 60 and the sound insulation layer 50 is cut to size together to define the external shape, so that a standard size and/or a shape adapted to the room 101 of the sensor mat 4 is obtained. Additionally or alternatively, the intermediate element 16 can be designed as a sound insulation layer 50.

The above explanation of the embodiments dictates the present invention exclusively in the context of examples. Of course, individual features of the embodiments can be freely combined with each other, if technically reasonable, without leaving the scope of the present invention.

LIST OF REFERENCE SIGNS 1.1 floor heating system
1.2 surface sensor system
2 energy source
3 event
4 sensor mat
4.1 master element
10 base unit
11 carrier element
11.1 first base side
11.2 second base side
12 edge region
13 central region
14.1 first protective layer
14.2 second protective layer
14.3 further protective layer
14.4 casting compound
15 nominal cutting line
16 intermediate element
20 electrical heating means
21 resistor element
21.1 carbon
21.2 filler
22 control unit
23 heating conductor element
24 temperature sensor
25 connection section
30 sensing means
30.1 sensor element
31 electrode
31.1 sensor material
32 decentralized evaluation unit
33 central control apparatus
34 sensing region
35 data line
35.1 ring section
35.2 supply section
36 data connection
37 passage element
40 electrical connection
40.1 electrical coupling
41 connection interface
41.1 alignment means
42 conductor track
43 counter-connection interface
44 fixing interface
45 heating connection
46 recess
50 sound insulation layer
60 sealing layer
60.1 fibre layer
70 adhesive layer
71 adhesive tape
71.1 first adhesive region
71.2 second adhesive region
80 external computing unit
81 mobile terminal
90 connection means
93 counter-connection means
96 connection unit 97 connection body
97.1 first contact section
97.2 second contact section
97.3 first contact element
97.4 second contact element
97.5 counter-positioning aid
98 fixing body
99 magnet
100 building
101 room
102 structural element
103 functional cover
104 visual cover
110 limiting element
200 method for producing a sensor mat
A bending angle
R bending radius
T1-Tn points of time

The invention claimed is:

1. A sensor mat for a surface sensor system, comprising a flexible base unit having: a first carrier element, which has a flat extension with a first base side and a second base side, a group of at least two sensor elements for detecting an event, a second carrier element comprising a first and a second base side, and an intermediate element arranged between the first carrier element and the second carrier element, and a plurality of electrical connectors arranged in edge regions of the flexible base unit to connect the sensor mat to at least one of an energy source, a control unit and another sensor mat; wherein the group of the at least two sensor elements are arranged on the second base side of the first carrier element in such a way that the base unit can be laid flat for a design of the surface sensor system, wherein each member of the at least two sensor elements having a detection area and the group of the at least two sensor elements is connected to at least one decentralized evaluation unit for processing sensor data of the group of the at least two sensor elements, which evaluation unit has a processor and is connectable to a central control unit, wherein the at least one decentralized evaluation unit extends at least partially into a receiving opening of the intermediate element; wherein a plurality of connection sections are extended in a cross-like manner to provide at least one electrical connection between the at least one decentralized evaluation unit and the plurality of electrical connectors; wherein each member of the group of the at least two sensor elements is connected to a respective one of the at least one decentralized evaluation unit, or the at least one decentralized evaluation unit is connected to each member of the group of the at least two sensor elements of the sensor mat.

2. The sensor mat according to claim 1, wherein at least one member of the group of the at least two sensor elements comprises at least one electrode for capacitive detection of the event or comprises an electrode which is designed as a shield electrode for limiting an electric field.

3. The sensor mat according to claim 1, wherein at least a sound insulation layer or a sealing layer is arranged on the base unit.

4. The sensor mat according to claim 1, wherein the sensor mat forms a sensor module which can be connected together with further sensor modules for the design of the surface sensor system.

5. The sensor mat according to claim 1, wherein an electrical heating unit is provided for emitting heat.

6. The sensor mat according to claim 1, wherein the second carrier element comprises thereon an electrical heating unit.

7. The sensor mat according to claim 1, wherein the first carrier element is at least partially spaced apart from the second carrier element.

8. The sensor mat according to claim 1, wherein at least an electrical heating unit is in a firmly-bonded connection to at least the first or second carrier element or the group of the at least two sensor elements is in a firmly-bonded connection to the first carrier element.

9. The sensor mat according to claim 1, wherein an electrical heating comprises at least one resistor element, wherein the resistor element comprises a cured carbon paste.

10. The sensor mat according to claim 1, wherein a temperature sensor is provided for at least calibrating or adjusting an electrical heating.

11. The sensor mat according to claim 1, wherein at least the first or second carrier element comprise a plastic.

12. The sensor mat according to claim 1, wherein an electrical heating is at least partially covered by at least a first electrically insulating protective layer or the group of the at least two sensor elements is at least partially covered by a second electrically insulating protective layer.

13. The sensor mat according to claim 1, wherein the at least one electrical connection comprises at least a heating connection, which is connected to an electrical heating or a data connection, which is connected to the at least two sensor elements.

14. The sensor mat according to claim 1, wherein the at least one electrical connection comprises a connection interface for connecting at least an electrical heating or the group of the at least two sensor elements to a connection unit for connecting the connection interface to a counter-connection interface, wherein the connection interface comprises a recess in the base unit for receiving the connection unit.

15. The sensor mat according to claim 9, wherein an electrical heating comprises a heating conductor element to connect the resistor element to a conductor path.

16. The sensor mat according to claim 15, wherein the conductor path is at least in a firmly-bonded connection to at least the first or second carrier element or arranged circumferentially around at least the first or second carrier element.

17. The sensor mat according to claim 1, wherein at least a plurality of sensor elements of the group of the at least two sensor elements are arranged in a regular distribution pattern or a plurality of resistor elements of an electrical heating is arranged in a regular distribution pattern on the first base side of the first and/or second carrier element.

18. The sensor mat according to claim 1, wherein at least the group of the at least two sensor elements or the at least one decentralized evaluation unit can be connected to a central control apparatus.

19. The sensor mat according to claim 1, wherein the at least one decentralized evaluation unit is arranged on the first base side or the second base side of at least the first or second carrier element on the base unit.

20. The sensor mat according to claim 1, wherein the base unit comprises at least one data line which is in communication connection at least with the group of the at least two sensor elements or with the at least one decentralized evaluation unit, wherein the at least one data line is connected to a data connection which is accessible from outside the base unit.

21. The sensor mat according to claim 20, wherein at least the at least one decentralized evaluation unit extends at least partially into a receiving opening of the intermediate element or at least one sensor element of the group of the at least two sensor elements is connected to the at least one data line by the at least one decentralized evaluation unit.

22. The sensor mat according to claim 1, wherein at least the at least one decentralized evaluation unit or an electrical heating is electrically coupled to the at least one electrical connection by a connection section.

23. The sensor mat according to claim 1, wherein a plurality of electrical connections, is arranged in an edge region of the base unit.

24. The sensor mat according to claim 20, wherein the at least one data line at least comprises a ring section which runs at least partially circumferentially around a central region of the base unit or is connected via the ring section to a plurality of data connections which are arranged in an edge region of the base unit.

25. A surface sensor system for detecting an event in a room of a building, wherein at least one sensor mat for a surface sensor system, comprising:
a flexible base unit having:
a first carrier element, which has a planar extension with a first base side and a second base side,
a group of at least two sensor elements for detecting an event, wherein the group of the at least two sensor elements are arranged on the second base side of the first carrier element in such a way that the base unit can be laid flat for a design of the surface sensor system to be laid flat on a structural element of the building,
a second carrier element, and
an intermediate element arranged between the first carrier element and the second carrier element;
a plurality of electrical connectors arranged in edge regions of the flexible base unit to connect the at least one sensor mat to at least one of an energy source, a control unit and another sensor mat;
wherein each member of the group of the at least two sensor elements having a detection area and the group of the at least two sensor elements being connected to at least one decentralized evaluation unit for processing sensor data from the group of the at least two sensor elements, which evaluation unit has a processor and is connectable to a central control unit,
wherein the base unit has a second carrier element and an intermediate element is arranged between the first and second carrier element,
wherein the at least one decentralized evaluation unit extends at least partially into a receiving opening of the intermediate element,
wherein a plurality of connection sections are extended in a cross-like manner to provide at least one electrical connection between the at least one decentralized evaluation unit and the plurality of electrical connectors,
wherein each member of the group of the at least two sensor elements is connected to a respective one of the at least one decentralized evaluation unit, or the at least one decentralized evaluation unit is connected to each member of the group of the at least two sensor elements of the at least one sensor mat.

26. A method for producing a sensor mat for a surface sensor system comprising the following steps:
providing a first carrier element, which comprises a flat extension with a first base side and a second base side, a second carrier element, and an intermediate element is arranged between the first and second carrier element,
constructing a flexible base unit, wherein an application of a group of at least two sensor elements for detecting an event on the second base side of the first carrier element is carried out, so that at least the base unit can be laid flat for the design of the surface sensor system,
wherein each member of the group of the at least two sensor elements having a detection area and the group of the at least two sensor elements is connected to at least one decentralized evaluation unit for processing sensor data from the group of the at least two sensor elements, which evaluation unit has a processor and is connectable to a central control unit,
wherein the decentralized evaluation unit extends at least partially into a receiving opening of the intermediate element,
wherein each member of the group of the at least two sensor elements is connected to a respective one of the at least one decentralized evaluation unit, or the at least one decentralized evaluation unit being connected to each member of the group of the at least two sensor elements of the sensor mat;
wherein a plurality of electrical connectors are arranged in edge regions of the flexible base unit to connect the sensor mat to at least one of an energy source, a control unit and another sensor mat and a plurality of connection sections are extended in a cross-like manner to provide at least one electrical connection between the at least one decentralized evaluation unit and the plurality of electrical connectors.

* * * * *